United States Patent
Berard et al.

(10) Patent No.: US 12,097,609 B2
(45) Date of Patent: Sep. 24, 2024

(54) CONTINUOUS SLIP RECOVERY

(71) Applicant: Boston Dynamics, Inc., Waltham, MA (US)

(72) Inventors: Stephen Berard, Waltham, MA (US); Alex Yu Khripin, Waltham, MA (US); Benjamin Swilling, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 17/573,265

(22) Filed: Jan. 11, 2022

(65) Prior Publication Data
US 2022/0134576 A1     May 5, 2022

Related U.S. Application Data

(60) Continuation of application No. 16/889,035, filed on Jun. 1, 2020, now Pat. No. 11,247,344, which is a
(Continued)

(51) Int. Cl.
*B25J 13/08*    (2006.01)
*B62D 57/032*    (2006.01)
*B25J 19/00*    (2006.01)

(52) U.S. Cl.
CPC .......... *B25J 13/085* (2013.01); *B62D 57/032* (2013.01); *B25J 19/0008* (2013.01);
(Continued)

(58) Field of Classification Search
CPC ... B25J 13/085; B25J 19/0008; B62D 57/032; Y10S 901/01; Y10S 901/27; Y10S 901/28; Y10S 901/30

See application file for complete search history.

(56) References Cited

U.S. PATENT DOCUMENTS

| 4,834,200 A | 5/1989 | Kajita |
| 5,151,859 A | 9/1992 | Yoshino et al. |

(Continued)

FOREIGN PATENT DOCUMENTS

| CN | 101870311 B | 5/2012 |
| CN | 102530122 A | 7/2012 |

(Continued)

OTHER PUBLICATIONS

Focchi et al., Instituto Italiano d: Technologies "Slip Recovery for Quadruped Robots" 3 pages (2015).

(Continued)

*Primary Examiner* — Jason Holloway
(74) *Attorney, Agent, or Firm* — Knobbe, Martens, Olson & Bear, LLP

(57) ABSTRACT

The disclosure provides systems and methods for mitigating slip of a robot appendage. In one aspect, a method for mitigating slip of a robot appendage includes (i) receiving an input from one or more sensors, (ii) determining, based on the received input, an appendage position of the robot appendage, (iii) determining a filter position for the robot appendage, (iv) determining a distance between the appendage position and the filter position, (v) determining, based on the distance, a force to apply to the robot appendage, (vi) causing one or more actuators to apply the force to the robot appendage, (vii) determining whether the distance is greater than a threshold distance, and (viii) responsive to determining that the distance is greater than the threshold distance, the control system adjusting the filter position to a position, which is the threshold distance from the appendage position, for use in a next iteration.

20 Claims, 9 Drawing Sheets

Related U.S. Application Data continuation of application No. 15/901,419, filed on Feb. 21, 2018, now Pat. No. 10,688,667, which is a division of application No. 15/005,687, filed on Jan. 25, 2016, now Pat. No. 9,925,667.

(52) U.S. Cl.
CPC ............ Y10S 901/01 (2013.01); Y10S 901/27 (2013.01); Y10S 901/28 (2013.01); Y10S 901/30 (2013.01)

(56) References Cited

U.S. PATENT DOCUMENTS

| | | |
|---|---|---|
| 5,221,883 A | 6/1993 | Takenaka et al. |
| 5,355,064 A | 10/1994 | Yoshino et al. |
| 5,357,433 A | 10/1994 | Takenaka et al. |
| 5,416,393 A | 5/1995 | Gomi et al. |
| 5,423,708 A | 6/1995 | Allen |
| 5,432,417 A | 7/1995 | Takenaka et al. |
| 5,459,659 A | 10/1995 | Takenaka |
| 5,644,204 A | 7/1997 | Nagle |
| 5,737,217 A | 4/1998 | Nishikawa et al. |
| 5,802,382 A | 9/1998 | Greenberger et al. |
| 5,808,433 A | 9/1998 | Tagami et al. |
| 5,838,130 A | 11/1998 | Ozawa |
| 5,842,533 A | 12/1998 | Takeuchi |
| 5,974,366 A | 10/1999 | Kawai et al. |
| 6,064,167 A | 5/2000 | Takenaka et al. |
| 6,243,623 B1 | 6/2001 | Takenaka et al. |
| 6,289,265 B1 | 9/2001 | Takenaka et al. |
| 6,317,652 B1 | 11/2001 | Osada |
| 6,374,157 B1 | 4/2002 | Takamura |
| 6,462,498 B1 | 10/2002 | Filo |
| 6,463,356 B1 | 10/2002 | Hattori |
| 6,484,068 B1 | 11/2002 | Yamamoto et al. |
| 6,493,607 B1 | 12/2002 | Bourne et al. |
| 6,802,382 B2 | 10/2004 | Hattori et al. |
| 6,898,485 B2 | 5/2005 | Kuroki et al. |
| 6,920,374 B2 | 7/2005 | Takenaka et al. |
| 6,943,520 B2 | 9/2005 | Furuta et al. |
| 6,992,455 B2 | 1/2006 | Kato et al. |
| 6,992,457 B2 | 1/2006 | Furuta et al. |
| 6,999,851 B2 | 2/2006 | Kato et al. |
| 7,013,201 B2 | 3/2006 | Hattori et al. |
| 7,031,806 B2 | 4/2006 | Kuroki et al. |
| 7,076,331 B1 | 7/2006 | Nagatsuka et al. |
| 7,120,518 B2 | 10/2006 | Takenada et al. |
| 7,236,852 B2 | 6/2007 | Moridaira et al. |
| 7,308,336 B2 | 12/2007 | Takenaka et al. |
| 7,319,918 B2 | 1/2008 | Takenaka et al. |
| 7,319,919 B2 | 1/2008 | Takenaka et al. |
| 7,379,789 B2 | 5/2008 | Takenada et al. |
| 7,386,364 B2 | 6/2008 | Mikami et al. |
| 7,437,214 B2 | 10/2008 | Sabe et al. |
| 7,598,695 B2 | 10/2009 | Takanishi et al. |
| 7,603,234 B2 | 10/2009 | Takenaka et al. |
| 7,606,634 B2 | 10/2009 | Takenada et al. |
| 7,657,345 B2 | 2/2010 | Endo et al. |
| 7,664,569 B2 | 2/2010 | Shimizu et al. |
| 7,734,377 B2 | 6/2010 | Hasegawa |
| 7,734,378 B2 | 6/2010 | Takenaka et al. |
| 7,805,218 B2 | 9/2010 | Nagasaka |
| 7,881,824 B2 | 2/2011 | Nagasaka et al. |
| 7,949,430 B2 | 5/2011 | Pratt et al. |
| 8,005,573 B2 | 8/2011 | Takenaka et al. |
| 8,060,253 B2 | 11/2011 | Goswami et al. |
| 8,108,070 B2 | 1/2012 | Tajima |
| 8,172,013 B2 | 5/2012 | Shimada |
| 8,195,332 B2 | 6/2012 | Pratt et al. |
| 8,237,390 B2 | 8/2012 | Godler et al. |
| 8,239,084 B2 | 8/2012 | Yamamoto et al. |
| 8,306,657 B2 | 11/2012 | Yoshiike et al. |
| 8,311,131 B2 | 11/2012 | Woyzichovski |
| 8,311,677 B2 | 11/2012 | Yoshiike et al. |
| 8,311,731 B2 | 11/2012 | Sugiura |
| 8,326,459 B2 | 12/2012 | Zaier |
| 8,332,068 B2 | 12/2012 | Goswami et al. |
| 8,386,076 B2 | 2/2013 | Honda et al. |
| 8,396,593 B2 | 3/2013 | Orita |
| 8,457,830 B2 | 6/2013 | Goulding |
| 8,509,948 B2 | 8/2013 | Roh et al. |
| 8,532,824 B2 | 9/2013 | Orita |
| 8,565,921 B2 | 10/2013 | Doi |
| 8,583,283 B2 | 11/2013 | Takenaka et al. |
| 8,630,763 B2 | 1/2014 | Goulding |
| 8,688,307 B2 | 4/2014 | Sekiya |
| 8,738,178 B2 | 5/2014 | Choi et al. |
| 8,805,580 B2 | 8/2014 | Kamioka et al. |
| 8,814,949 B2 | 8/2014 | Gramnaes |
| 8,825,391 B1 | 9/2014 | Urmson et al. |
| 8,849,454 B2 | 9/2014 | Yun et al. |
| 8,855,820 B2 | 10/2014 | Seo et al. |
| 8,855,821 B2 | 10/2014 | Seo et al. |
| 8,864,846 B2 | 10/2014 | Herr et al. |
| 8,924,021 B2 | 12/2014 | Dariush et al. |
| 8,938,319 B2 | 1/2015 | Park et al. |
| 8,942,848 B2 | 1/2015 | Pratt et al. |
| 8,948,956 B2 | 2/2015 | Takahashi et al. |
| 8,958,915 B2 | 2/2015 | Takagi |
| 8,965,573 B2 | 2/2015 | Maisonnier et al. |
| 8,987,896 B2 | 3/2015 | Cheah et al. |
| 9,043,029 B2 | 5/2015 | Seo |
| 9,044,862 B2 | 6/2015 | Kim et al. |
| 9,102,055 B1 | 8/2015 | Konolige et al. |
| 9,207,678 B2 | 12/2015 | Kim |
| 9,259,838 B1 | 2/2016 | Blankespoor et al. |
| 9,266,233 B2 | 2/2016 | Kornbluh et al. |
| 9,283,949 B2 | 3/2016 | Saunders et al. |
| 9,308,648 B2 | 4/2016 | Perkins et al. |
| 9,317,743 B2 | 4/2016 | Datta et al. |
| 9,352,470 B1 | 5/2016 | da Silva et al. |
| 9,376,151 B2 | 6/2016 | Park et al. |
| 9,387,588 B1 | 7/2016 | Blankespoor et al. |
| 9,387,896 B1 * | 7/2016 | Blankespoor ........ B62D 57/032 |
| 9,395,726 B1 | 7/2016 | Rizzi et al. |
| 9,446,518 B1 | 9/2016 | Blankespoor |
| 9,499,218 B1 | 11/2016 | Stephens |
| 9,561,592 B1 | 2/2017 | Silva et al. |
| 9,594,377 B1 | 3/2017 | Perkins et al. |
| 9,618,937 B1 | 4/2017 | Blankespoor et al. |
| 9,623,568 B1 | 4/2017 | da Silva et al. |
| 9,663,165 B1 | 5/2017 | Blankespoor et al. |
| 9,731,416 B1 | 8/2017 | Saunders et al. |
| 9,789,611 B1 | 10/2017 | Blankespoor et al. |
| 9,862,095 B2 | 1/2018 | Takagi et al. |
| 9,925,667 B1 | 3/2018 | Berard et al. |
| 9,926,025 B1 | 3/2018 | Blankespoor et al. |
| 10,081,098 B1 | 9/2018 | Nelson et al. |
| 10,220,518 B2 | 3/2019 | Jackowski et al. |
| 10,226,870 B1 | 3/2019 | da Silva et al. |
| 10,246,151 B1 | 4/2019 | Stephens |
| 10,300,969 B1 | 5/2019 | Blankespoor et al. |
| 10,406,690 B1 | 9/2019 | Blankespoor et al. |
| 10,441,439 B2 | 10/2019 | Goldfarb et al. |
| 10,668,624 B2 | 6/2020 | Blankespoor et al. |
| 10,688,667 B1 | 6/2020 | Berard et al. |
| 10,888,999 B2 | 1/2021 | Blankespoor et al. |
| 11,203,385 B1 | 12/2021 | Blankespoor et al. |
| 11,225,294 B1 | 1/2022 | Stephens |
| 11,247,344 B2 | 2/2022 | Berard et al. |
| 11,654,569 B2 | 5/2023 | Blankespoor et al. |
| 11,654,984 B2 | 5/2023 | Blankespoor et al. |
| 11,654,985 B2 | 5/2023 | Stephens |
| 2002/0183897 A1 | 12/2002 | Kuroki et al. |
| 2003/0009259 A1 | 1/2003 | Hattori et al. |
| 2003/0114960 A1 | 6/2003 | Takenaka et al. |
| 2003/0120388 A1 | 6/2003 | Kuroki et al. |
| 2003/0125839 A1 | 7/2003 | Takenaka et al. |
| 2003/0154201 A1 | 8/2003 | Berestov |
| 2004/0044440 A1 | 3/2004 | Takenaka |
| 2004/0099450 A1 | 5/2004 | Kowk et al. |
| 2004/0167641 A1 | 8/2004 | Kawai et al. |
| 2004/0172165 A1 | 9/2004 | Iribe et al. |

(56) References Cited

U.S. PATENT DOCUMENTS

| | | |
|---|---|---|
| 2004/0193323 A1 | 9/2004 | Higaki et al. |
| 2004/0205417 A1 | 10/2004 | Moridaira et al. |
| 2004/0206164 A1 | 10/2004 | Kawai et al. |
| 2004/0230340 A1 | 11/2004 | Fukuchi et al. |
| 2004/0236467 A1 | 11/2004 | Sano |
| 2005/0021176 A1 | 1/2005 | Takenaka et al. |
| 2005/0033475 A1 | 2/2005 | Kuroki et al. |
| 2005/0065650 A1 | 3/2005 | Lewis |
| 2005/0067993 A1 | 3/2005 | Kato et al. |
| 2005/0075755 A1 | 4/2005 | Takenaka et al. |
| 2005/0077856 A1 | 4/2005 | Takenaka et al. |
| 2005/0110448 A1 | 5/2005 | Takenaka et al. |
| 2005/0113973 A1 | 5/2005 | Endo et al. |
| 2005/0120820 A1 | 6/2005 | Takenaka et al. |
| 2005/0125099 A1 | 6/2005 | Mikami et al. |
| 2005/0126833 A1 | 6/2005 | Takenaka et al. |
| 2005/0156551 A1 | 7/2005 | Takenaka et al. |
| 2005/0165507 A1 | 7/2005 | Shimizu et al. |
| 2005/0216097 A1 | 9/2005 | Rikin |
| 2005/0228539 A1 | 10/2005 | Takenaka et al. |
| 2005/0240307 A1 | 10/2005 | Kuroki et al. |
| 2006/0064203 A1 | 2/2006 | Goto et al. |
| 2006/0076167 A1 | 4/2006 | Setrakian et al. |
| 2006/0090938 A1 | 5/2006 | Tanielian |
| 2006/0173578 A1 | 8/2006 | Takenaka et al. |
| 2006/0247800 A1 | 11/2006 | Takenaka et al. |
| 2007/0003915 A1 | 1/2007 | Templeman |
| 2007/0013506 A1 | 1/2007 | Takenaka et al. |
| 2007/0016329 A1 | 1/2007 | Herr et al. |
| 2007/0126387 A1 | 6/2007 | Takenaka et al. |
| 2007/0150095 A1 | 6/2007 | Zaier |
| 2007/0152620 A1 | 7/2007 | Takenaka et al. |
| 2007/0156283 A1 | 7/2007 | Takeneka |
| 2007/0162152 A1 | 7/2007 | Herr et al. |
| 2007/0168080 A1 | 7/2007 | Takenaka et al. |
| 2007/0193789 A1 | 8/2007 | Takenaka et al. |
| 2007/0220637 A1 | 9/2007 | Endo et al. |
| 2007/0227786 A1 | 10/2007 | Hillis et al. |
| 2007/0241713 A1 | 10/2007 | Yamamoto et al. |
| 2007/0273320 A1 | 11/2007 | Shishido et al. |
| 2008/0065269 A1 | 3/2008 | Hasegawa |
| 2008/0133055 A1 | 6/2008 | Hasegawa |
| 2008/0160873 A1 | 7/2008 | Yoneda |
| 2008/0208391 A1 | 8/2008 | Hasegawa et al. |
| 2009/0005906 A1 | 1/2009 | Tajima |
| 2009/0030530 A1 | 1/2009 | Martin |
| 2009/0171503 A1 | 7/2009 | Takenaka et al. |
| 2009/0306821 A1 | 12/2009 | Park et al. |
| 2009/0312867 A1 | 12/2009 | Hasegawa et al. |
| 2009/0325699 A1 | 12/2009 | Delgiannidis |
| 2010/0017028 A1 | 1/2010 | Suga et al. |
| 2010/0113980 A1 | 5/2010 | Herr et al. |
| 2010/0114329 A1 | 5/2010 | Casler et al. |
| 2010/0126785 A1 | 5/2010 | Shimada |
| 2010/0057253 A1 | 6/2010 | Kwon et al. |
| 2010/0161120 A1 | 6/2010 | Goswami et al. |
| 2010/0161126 A1 | 6/2010 | Goswami et al. |
| 2010/0174409 A1* | 7/2010 | Park ................. G05D 1/0253 700/259 |
| 2010/0243344 A1 | 9/2010 | Wyrobek et al. |
| 2010/0252395 A1 | 10/2010 | Lehtonen et al. |
| 2010/0277483 A1 | 11/2010 | Lee et al. |
| 2010/0292838 A1 | 11/2010 | Goswami et al. |
| 2011/0009241 A1 | 1/2011 | Lane et al. |
| 2011/0022232 A1 | 1/2011 | Yoshiike et al. |
| 2011/0098856 A1 | 4/2011 | Yoshiike |
| 2011/0098857 A1 | 4/2011 | Yoshiike et al. |
| 2011/0098860 A1 | 4/2011 | Yoshiike et al. |
| 2011/0172823 A1 | 7/2011 | Kim et al. |
| 2011/0172825 A1 | 7/2011 | Lee et al. |
| 2011/0178636 A1 | 7/2011 | Kwon et al. |
| 2011/0178637 A1 | 7/2011 | Lee et al. |
| 2011/0224827 A1 | 9/2011 | Andoh |
| 2011/0231050 A1 | 9/2011 | Goulding |
| 2011/0257764 A1 | 10/2011 | Herr et al. |
| 2011/0264264 A1 | 10/2011 | Shirokura et al. |
| 2011/0301756 A1 | 12/2011 | Yoshiike et al. |
| 2012/0072026 A1 | 3/2012 | Takagi |
| 2012/0143376 A1 | 6/2012 | Seo |
| 2012/0158175 A1 | 6/2012 | Lee et al. |
| 2012/0158181 A1 | 6/2012 | Seo |
| 2012/0158182 A1 | 6/2012 | Lee et al. |
| 2012/0203359 A1 | 8/2012 | Schimmels et al. |
| 2012/0245734 A1 | 9/2012 | Yun et al. |
| 2012/0259463 A1 | 10/2012 | Orita |
| 2012/0277907 A1 | 11/2012 | Kim et al. |
| 2012/0303162 A1 | 11/2012 | Orita |
| 2012/0310412 A1 | 12/2012 | Seo et al. |
| 2012/0316662 A1 | 12/2012 | Huh et al. |
| 2012/0316682 A1 | 12/2012 | Seo et al. |
| 2012/0316683 A1 | 12/2012 | Seo et al. |
| 2012/0316684 A1 | 12/2012 | Lee et al. |
| 2013/0079929 A1 | 3/2013 | Lim et al. |
| 2013/0123669 A1 | 5/2013 | Kinoshita et al. |
| 2013/0144439 A1 | 6/2013 | Lee et al. |
| 2013/0144441 A1 | 6/2013 | Kanazawa et al. |
| 2013/0158712 A1 | 6/2013 | Lee et al. |
| 2013/0178983 A1 | 7/2013 | Watabe |
| 2013/0184861 A1 | 7/2013 | Pratt et al. |
| 2013/0206488 A1 | 8/2013 | Horinouchi |
| 2013/0238122 A1 | 9/2013 | Hodgins et al. |
| 2013/0238183 A1 | 9/2013 | Goulding |
| 2014/0019082 A1 | 1/2014 | Lan et al. |
| 2014/0081424 A1 | 3/2014 | Herr et al. |
| 2014/0081461 A1 | 3/2014 | Williamson et al. |
| 2014/0320489 A1 | 10/2014 | Chizeck et al. |
| 2015/0051734 A1 | 2/2015 | Zheng et al. |
| 2015/0073592 A1 | 3/2015 | Kaneko et al. |
| 2015/0120044 A1 | 4/2015 | Cory |
| 2015/0134079 A1 | 5/2015 | Yoon et al. |
| 2015/0134080 A1 | 5/2015 | Roh |
| 2015/0202768 A1 | 7/2015 | Moridaira |
| 2015/0202775 A1 | 7/2015 | Inazumi |
| 2015/0217447 A1 | 8/2015 | Kamioka et al. |
| 2015/0286221 A1 | 10/2015 | Goulding |
| 2015/0297934 A1 | 10/2015 | Agrawal et al. |
| 2015/0302777 A1 | 10/2015 | Campolo et al. |
| 2016/0016308 A1 | 1/2016 | Kanazawa et al. |
| 2019/0351555 A1 | 11/2019 | Blankespoor et al. |
| 2020/0269430 A1 | 8/2020 | Blankespoor et al. |
| 2020/0290213 A1 | 9/2020 | Berard et al. |
| 2021/0146548 A1 | 5/2021 | Blankespoor et al. |
| 2021/0171135 A1 | 6/2021 | Blankespoor et al. |
| 2022/0143828 A1 | 5/2022 | Blankespoor et al. |
| 2023/0264358 A1 | 8/2023 | Blankespoor et al. |
| 2023/0322315 A1 | 10/2023 | Stephens |

FOREIGN PATENT DOCUMENTS

| | | |
|---|---|---|
| CN | 102785542 A | 11/2012 |
| EP | 2110210 | 3/2011 |
| JP | 2007061953 A | 3/2007 |
| KR | 100815247 B1 | 3/2008 |
| KR | 20100100119 A | 9/2010 |
| KR | 101046710 B1 | 7/2011 |
| WO | WO 2016119068 | 8/2016 |

OTHER PUBLICATIONS

Boone et al., Autonomous Robots 4(3), "Slepping and Tripping Reflexes for Bipedal Robots," College of Computing, Georgia Institute of Technology, 11 pages (Dec. 1996).

Abe et al., "Multiobjective Control with Frictional Contacts", Association for Computing Machinery, Inc. SIGGRAPH Symposium on Computer Animation, Aug. 4-5, 2007, San Diego, California.

Bajracharya et al., "High fidelity day/night stereo mapping with vegetation and negative obstacle detection for vision-in-the-loop walking", 2013, IEEE, p. 3663-3670.

Brandao et al., "Footstep Planning for Slippery and Slanted Terrain Using Human-Inspired Models," 2016, IEEE, p. 868-879.

Doshi et al., "Collision Detection in Legged Locomotion using Supervised Learning," 2007, MIT Cambridge, US.

(56) References Cited

OTHER PUBLICATIONS

Hashlamon et al., "Simple Virtual Slip Force Sensor for walking biped robots," 2013, IEEE, p. 1-5.
Hyon et al., "Simultaneous Adaption to Rough Terrain and Unknown External Forces for Biped Humanoids," 2007, IEEE, p. 19-26.
Joo et al., "Balancing of Legged Mechanism with Multiple Segments," 2013, IEEE, p. 5683-5688.
Kawamura et al., "Maintaining floor-foot contact of a biped robot by force constraint position control," 2011, IEEE, p. 857-862.
Kim et al., "Landing Force Controller for a Humanoid Robot: Time-Domain Passivity Approach", 2006, IEEE, p. 4237-4242.
Koolen et al., "Capturability-based analysis and control of legged locomotion, Part 1: Theory andapplication to three simple gait models", The International Journal of Robotics Research, 2012, p. 1094-1113, vol. 31, No. 9.
Pratt et al., "Capture Point: A Step toward Humanoid Push Recovery", IEEE Humanoid Robots, 2006 6th IEEE-RAS International Conference, Symposium, Dec. 2, 2006, pp. 1-8, Genoa, Italy.
Pratt et al., "Capturability-based analysis and control of legged locomotion, Part 2: Application toIM2V2, a lower-body humanoid", The International Journal of Robotics Research, Apr. 2011, pp. 1-25.
Silva et al., "Towards force interaction control of biped walking robots," 2004, IEEE, p. 2568-2573.
Silva et al., "Goal-oriented biped walking based on force interaction control," 2001, IEEE, p. 4122-4127.
Complaint filed Nov. 11, 2022, *Boston Dynamics, Inc. v. Ghost Robotics Corporation*, Case No. 1.22-cv-01483-UNA (D. Del.), 110 pages (involving U.S. Pat. Nos. 9,308,648; 9,662,791; 11,123,869; 9,387,588; 11,073,842; 10,253,855; 11,131,368).
Non-Final Office Action dated Aug. 19, 2015, issued in connection with U.S. Appl. No. 14/468,118**, Filed on Aug. 25, 2014, 14 pages.
Notice of Allowance dated Mar. 14, 2016, issued in connection with U.S. Appl. No. 14/468,118**, Filed on Aug. 25, 2014, 10 pages.
Non-Final Office Action dated Sep. 2, 2015, issued in connection with U.S. Appl. No. 14/468,031**, Filed on Aug. 25, 2014, 31 pages.
Notice of Allowance dated Mar. 2, 2016, issued in connection with U.S. Appl. No. 14/468,031**, Filed on Aug. 25, 2014, 7 pages.
Non-Final Office Action dated Apr. 29, 2016,, issued in connection with U.S. Appl. No. 14/709,830**, Filed on May 12, 2015, 39 pages.
Non-Final Office Action dated Apr. 15, 2016,, issued in connection with U.S. Appl. No. 14/585,542**, Filed on Dec. 30, 2014, 12 pages.
Non-Final Office Action dated Jun. 3, 2016,, issued in connection with U.S. Appl. No. 14/538,777**, Filed on Nov. 11, 2014, 16 pages.
Notice of Allowance dated Jun. 24, 2016, issued in connection with U.S. Appl. No. 14/538,777**, filed on Nov. 11, 2014, 20 pages.
Notice of Allowance dated Jul. 21, 2016, issued in connection with U.S. Appl. No. 14/585,542**, filed on Dec. 30, 2014, 5 pages.
"AlphaDog Proto," https://www.youtube.com/watch?v=SSbZrQp-HOk, Sep. 29, 2011, obtained Aug. 14, 2023.
"Atlas Update," https://www.youtube.com/watch?v=SD6Okylclb8, Oct. 3, 2013, obtained Aug. 14, 2023.
"BigDog Overview (Updated Mar. 2010)," https://www.youtube.com/watch?v=cNZPRsrwumQ, Apr. 22, 2010, obtained Aug. 14, 2023.
"BigDog Reflexes," https://www.youtube.com/watch?v=3gi6Ohnp9x8, Jan. 27, 2009, obtained Aug. 14, 2023.
"Petman," https://www.youtube.com/watch?v=mclbVTIYG8E, Oct. 30, 2011, obtained Aug. 14, 2023.
"Petman Prototype," https://www.youtube.com/watch?v=67CUudkjEG4, Oct. 26, 2009, obtained Aug. 14, 2023.
Van Der Ven, "Touchdown control in bipedal robot walking", http://resolver.tudelft.nl/uuid:Oe2da7cc-1f21-4ff8-a2a2-66e2c7bede20, Sep. 27, 2012, pp. 1-47.

Chestnutt, "Safe Adjustment Regions for Legged Locomotion Paths," 2010 IEEE-RAS International Conference on Humanoid Robots, Jan. 2011, http://dx.doi.org/10.1109/ICHR.2010.5686829.
"Boston Dynamics BIGDOG Robot," https://www.youtube.com/watch?v=b2bExqhhWRI, Jul. 17, 2007, obtained Oct. 5, 2023.
Kimura, "Adaptive Dynamic Walking of a Quadruped Robot Using a Neural System Model," Advanced Robotics, vol. 15, Issue 8 (2001), doi: 10.1109/IROS.2000.893146.
Boone, "Slipping and Tripping Reflexes for Bipedal Robots," Autonomous Robots 4, 259-271 (Sep. 1997), https://doi.org/10.1023/A:1008891909459.
Huang, "Sensory Reflex Control for Humanoid Walking," Transactions on Robotics, vol. 21, No. 5, at 980 (Sep. 2005), Doi: 10.1109/TRO.2005.851381.
Hamed, "Event-Based Stabilization of Periodic Orbits for Underactuated 3-D Bipedal Robots with Left-|Right Symmetry," IEEE Transactions on Robotics, vol. 30, No. 2, at 366 (Apr. 2014) doi: 10.1109/TRO.2013.2287831.
Hyun, "High speed trot-running: Implementation of a hierarchical controller using proprioceptive impedance control on the MIT Cheetah," vol. 33, issue 11, at 1418 (Aug. 21, 2014) https://dspace.mit.edu/handle/1721.1/98270.
Raibert, "Legged Robots that Balance," MIT press (Jan. 1986).
Gregorio, "Experiments with an electrically actuated planar hopping robot," Experimental Robotics III. Springer, Berlin, Heidelberg, at 2 (1994) https://citeseerx.ist.psu.edu/document?repid=rep1&type=pdf&doi=63c792133021c69c3bc736d04f3ac1a fb32f72ac.
Park, "A finite-state machine for accommodating unexpected large ground height variations in bipedal robot walking," IEEE Trans. on Robotics, vol. 29, issue 2, pp. 331-345 (Apr. 2013) doi: 10.1109/TRO.2012.2230992.
Bona, "Friction Compensation in Robotics: an Overview," 44th IEEE Conference on Decision and Control, and the European Control Conference, at 4360 (Dec. 2005) doi: 10.1109/CDC.2005.1582848.
Roosen, "Ground-Contact Friction Estimation and Slip Prevention in Bipedal Robots," University of Melbourne, at 34 (2012) https://rest.neptune-prod.its.unimelb.edu.au/server/api/core/bitstreams/7e3e0b95-1ce2-5b91-80d3-7e1fc9762377/content.
Papadopoulos, "Stable running in a quadruped robot with compliant legs," IEEE Conference Publication, IEEE Xplore, 444-449, at 446 (Apr. 2000) doi: 10.1109/ROBOT.2000.844095.
Kuffer, "Self-Collision Detection and Prevention for Humanoid Robots," Proceedings of the 2002 IEEE International Conference on Robotics & Automation, at 2267-68 (May 2002) doi: 10.1109/ROBOT.2002.1013569.
Yang, "Singularity Analysis of Three-Legged Parallel Robots Based on Passive-Joint Velocities," IEEETransactions on Robotics and Automation, vol. 17, No. 4, at 413 (Aug. 2001) doi: 10.1109/70.954754.
Dash, "Singularity-Free Path Planning of Parallel Manipulators Using Clustering Algorithm and Line Geometry," Proceedings of the 2003 IEEE, International Conference on Robotics & Automation, at 761 (Sep. 2003) doi: 10.1109/ROBOT.2003.1241685.
Havoutis, "Quadrupedal trotting with active compliance," 2013 IEEE International Conference onMechatronics (ICM), Vicenza, Italy, 2013, pp. 610-616, at 3, (Feb. 2013) doi: 10.1109/ICMECH.2013.6519112.
Nishiwaki, "A six-axis force sensor with parallel support mechanism to measure the ground reaction force of humanoid robot," Proceedings 2002 IEEE International Conference on Robotics and Automation (Cat. No. 02CH37292). vol. 3, at 2277, IEEE, (May 2002) doi: 10.1109/ROBOT.2002.1013571.
Okada, "Real-time and Precise Self Collision Detection System for Humanoid Robots," Proceedings of the 2005 IEEE International Conference on Robotics and Automation, Barcelona, Spain, Apr. 2005, doi: 10.1109/ROBOT.2005.1570256.
Kim, "Inverse Kinematic Control of Humanoids Under Joint Constraints," International Journal of Advanced Robotic Systems, at 1 (Jan. 2013) https://doi.org/10.5772/55247.
Yan, "A fast and smooth walking pattern generator of biped robot using Jacobian inverse kinematics," 2007 IEEE Workshop on

(56) References Cited

OTHER PUBLICATIONS

Advanced Robotics and Its Social Impacts, Hsinchu, Taiwan, 2007, pp. 1-6, doi: 10.1109/ARSO.2007.4531417.
Pratt, "Capture Point: A Step toward Humanoid Push Recovery," 2006 6th IEEE-RAS International Conference on Humanoid Robots, Genova, Italy, 2006, pp. 200-207, doi: 10.1109/ICHR.2006.321385.
Answer in *Boston Dynamics, Inc. v. Ghost Robotics Corporation*, Case No. 1.22-cv-01483-UNA (D. Del.), Feb. 10, 2023, 28 pages (involving U.S. Pat. Nos. 9,308,648, 9,662,791, 11,123,869, 9,387,588, 11,073,842, 10,253,855, 11,131,368).
Amended Answer in *Boston Dynamics, Inc. v. Ghost Robotics Corporation*, Case No. 1.22-cv-01483-UNA (D. Del.), Mar. 3, 2023, 25 pages (involving U.S. Pat. Nos. 9,308,648, 9,662,791, 11,123,869, 9,387,588, 11,073,842, 10,253,855, 11,131,368).
Defendant Ghost Robotics Corporation's Initial Invalidity Contentions in *Boston Dynamics, Inc. v. Ghost Robotics Corporation*, Case No. 1.22-cv-01483-UNA (D. Del.), Sep. 19, 2023, 48 pages (involving U.S. Pat. Nos. 9,308,648, 9,662,791, 11,123,869, 9,387,588, 11,073,842, 10,253,855, 11,131,368).
Exhibit D1 in *Boston Dynamics, Inc. v. Ghost Robotics Corporation*, Case No. 1.22-cv-01483-UNA (D.Del.), Sep. 19, 2023, 84 pages (involving U.S. Pat. Nos. 9,308,648, 9,662,791, 11,123,869, 9,387,588, 11,073,842, 10,253,855, 11,131,368).
Exhibit D2 in *Boston Dynamics, Inc. v. Ghost Robotics Corporation*, Case No. 1.22-cv-01483-UNA (D.Del.), Sep. 19, 2023, 101 pages (involving U.S. Pat. Nos. 9,308,648, 9,662,791, 11,123,869, 9,387,588, 11,073,842, 10,253,855, 11,131,368).
Second Amended Answer in *Boston Dynamics, Inc. v. Ghost Robotics Corporation*, Case No. 1.22-cv-01483-UNA (D. Del.), Oct. 18, 2023, 83 pages (involving U.S. Pat. Nos. 9,308,648, 9,662,791, 11,123,869, 9,387,588, 11,073,842, 10,253,855, 11,131,368).
Agrawal et al., "Rough Terrain Visual Odometry". Proceedings of the International Conference on Advanced Robotics (ICAR) Aug. 2007 vol. 25, p. 28-30.
Anderson et al., "Coordinated Control and Range Imaging for Mobile Manipulation". Experimental Robotics: The 11th International Symposium 2009, vol. 54. pg. 547-556, Springer Berlin Heidelberg; https://doi.org/10.1007/978-3-642-00196-3_63.
Barasuol et al., "A reactive Controller Framework for Quadrupedal Locomotion on Challenging|Terrain." IEEE Int'l Conference Robot Autom. Karlsruhe, Germany, May 6, 2013; p. 2554-2561, doi:10.1109/ICRA.2013.6630926.
Boston Dynamics, "LS3—Legged Squad Support System," video screen shots taken from https://www.youtube.com/watch?v=R7ezXBEBE6U&t=1s, Sep. 10, 2012, downloaded Feb. 2, 2024, 5 pages.
Buehler et al., "Robots Step Outside." Int'l Symp Adaptive Motion of Animals and Machines (AMAM), Sep. 2005; p. 1-4.
Cherouvim et al., Novel Energy Transfer Mechanism in a Running Quadruped Robot with one Actuator per Leg. Advan. Robotics. Jan. 1, 2010; vol. 24, No. 7, p. 963-978.
Chestnutt J., "Navigation Planning for Legged Robots." Thesis: Carnegie Mellon University, Pittsburgh, PA; Dec. 2007, 129 pages.
Darpa Tactical Technology Office, "Legged Squad Support System (LS3) Industry Day," https://web.archive.org/web/20090117140017/http://www.darpa.mil/tto/solicit/BAA08-71/LS3_Industry_Day.pdf, Nov. 12, 2008, website capture from Jan. 17, 2009, 42 pages.
Darpatv, "Meet ATLAS!," video screen shots taken from https://www.youtube.com/watch?v=zkBnFPBV3f0, Jul. 11, 2013, downloaded Feb. 2, 2024, 12 pages.
Ferguson et al., "A Guide to Heuristic-based Path Planning". Proceedings of the InternationalWorkshop on Planning Under Uncertainty for Autonomous Systems, Int'l Conference on Automated Planning and Scheduling (ICAPS) Jun. 6, 2005, p. 9-18.
Gallagher et al., "GATMO: A Generalized Approach to Tracking Movable Objects," In IEEE International lonference on Robotics and Automation May 1, 20092; p. 2043-2048, doi: 10.1109/ROBOT.2009.5152863.
Göner et al., "The DLR Crawler: Evaluation of Gaits and Control of an Actively Compliant Six-legged Walking Robot." Industrial Robot: An Int'l Journal Jun. 1, 20099; vol. 36, No. 4, p. 344-351, ISSN 0143-991X, DOI 10.1108/01439910910957101.
Gregorio et al., "Design, Control, and Energetics of an Electrically Actuated Legged Robot," IEEE Transactions on Systems, Man, and Cybernetics, Part B (Cybernetics), Aug. 1997; vol. 27, No. 4, p. 626-634, doi: 10.1109/3477.604106.
Hiller et al., "Design and control of a quadruped robot walking in unstructured terrain." Proceedings of the 2004 IEEE Int'l Conf Control Applications, Taipei, Taiwan, 2004, vol. 2, p. 916-921, doi:10.1109/CCA.2004.1387486.
Howard A., "Real-time Stereo Visual Odometry for Autonomous Ground Vehicles," IEEE/RSJ International Conference on Intelligent Robots and Systems, Sep. 2, 20082, p. 3946-3952, doi: 10.1109/IROS.2008.4651147.
Howard et al., "State Space Sampling of Feasible Motions for High Performance Mobile Robot Navigation in Highly Constrained Environments," J Field Robot. Jun. 2008; vol. 25, No. 6-7, p. 325-345.
Howard et al., "State Space Sampling of Feasible Motions for High Performance Mobile Robot Navigation in Highly Constrained Environments," In Laugier, C., Siegwart, R. (eds) Field and Service Robotics. Springer Tracts in Advanced Robotics, (2008) vol. 42, p. 585-593. Springer, Berlin, Heidelberg. https://doi.org/10.1007/978-3-540-75404-6_56.
Huang et al., "Planning Walking Patterns for a Biped Robot." IEEE Trans Robot Automation. Jun. 2001;vol. 17, No. 3, p. 280-289.
Kelly et al., Toward reliable off road autonomous vehicles operating in challenging environments. The International Journal of Robotics Research. May 2006; vol. 25, No. 5-6, p. 449-483.
Kimura et al., "Adaptive Dynamic Walking of a Quadruped Robot on Irregular Terrain Based on Biological Concepts." Int'l J Robot Res. Mar. 2003-Apr; vol. 22, No. 3-4, p. 187-202,.
Kimura et al., "Adaptive Dynamic Walking of a Quadruped Robot on Natural Ground Based on Biological Concepts." The Int'l J Robot Res. May 2007; vol. 26, No. 5, p. 475-490.
Lin J.-N., "Gait Transitions Of Legged Robots And Neural Networks Applications." Thesis University of Illinois at Chicago, 2001, 276 pages.
Matos V.E.S., "A Bio-inspired Architecture for Adaptive Quadruped Locomotion Over Irregular Terrain," Thesis, Oct. 2, 20134; 222 pages.
Michael K., "Meet Boston Dynamics' LS3—The Latest Robotic War Machine." The Conversation. Oct. 2, 2012; 8 pages, available at https://theconversation.com/meet-boston-dynamics-Is3-the-latest-robotic-warmachine-9754.
Murphy et al., "Trotting and Bounding in a Planar Two-legged Model." In Morecki et al., (eds) Theory and Practice of Robots and Manipulators. (1985), Springer, Boston, MA. 10 pages; https://doi.org/10.1007/978-1-4615-9882-4_43.
Neuhaus et al., "Comprehensive Summary of the Institute for Human and Machine Cognitions Experience with LittleDog," The International Journal of Robotics Research, Jan. 2011, 39 pages, DOI:10.1177/0278364910390538.
Park et al., "Optimal Locomotion Trajectory for Biped Robot 'D2'with Knees Stretched, Heel-contact Landings, and Toe-off Liftoffs." J Mech Science Tech. Dec. 2011; vol. 25, p. 3231-3241.
Raibert et al., Bigdog, the Rough-Terrain Quadruped Robot. IFAC Proceedings vols. Jan. 1, 2008; vol. 41, No. 2, p. 10822-10825.
Shkolnik et al., "Bounding on rough terrain with the LittleDog robot," The International Journal of Robotics Research, Dec. 2010, 30(2) pp. 192-215, doi: 10.1177/0278364910388315.
Van Der Kooij et al., "An alternative approach to synthesizing bipedal walking." Biol Cybern. Jan. 2003; vol. 88, p. 46-59.
Wettergreen D.S., "Robotic Walking in Natural Terrain—Gait Planning and Behavior-based Control for Statically-stable Walking Robots." Thesis: Carnegie Mellon University, Dec. 1995, 142 pages.
Wight D.L., "A Foot Placement Strategy for Robust Bipedal Gait Control." Thesis University of Waterloo, Canada; 2008, 210 pages.
Defendant *Ghost Robotics Corporation's Supplemental Identification of Invalidity References in Boston Dynamics, Inc. v. Ghost Robotics Corporation*, Case No. 1.22-cv-01483-UNA (D. Del.), Jan. 19, 2024, 23 pages (involving U.S. Pat. Nos. 9,308,648, 9,662,791, 11,123,869, 9,387,588, 11,073,842, 10,253,855, 11,131,368)).

(56) References Cited

OTHER PUBLICATIONS

Defendant *Ghost Robotics Corporation's Final Invalidity Contentions* in Boston Dynamics, Inc. v. GhostRobotics Corporation, Case No. 1.22-cv-01483-UNA (D. Del.), Mar. 7, 2024, 81 pages (involving U.S. Pat. Nos. 9,308,648, 9,662,791, 11,123,869, 9,387,588, 11,073,842, 10,253,855, 11,131,368).
Exhibit D1 (Redacted), *Boston Dynamics, Inc. v. Ghost Robotics Corporation*, Case No. 1.22-cv-01483-UNA (D. Del.), Mar. 7, 2024, 283 pages (involving U.S. Pat. Nos. 9,308,648, 9,662,791, 11,123,869, 9,387,588, 11,073,842, 10,253,855, 11,131,368).
Exhibit D2 (Redacted), *Boston Dynamics, Inc. v. Ghost Robotics Corporation*, Case No. 1.22-cv-01483-lUNA (D. Del.), Mar. 7, 2024, 66 pages (involving U.S. Pat. Nos. 9,308,648, 9,662,791, 11,123,869, 9,387,588, 11,073,842, 10,253,855, 11,131,368).
Complaint in *Boston Dynamics, Inc. v. Ghost Robotics Corporation*, Case No. 1.24-cv-00184-UNA (D.Del.), Feb. 12, 2024, 45 pages (involving U.S. Pat. Nos. 9,594,377, 9,908,240, 9,789,611, and 11,287,819).
Stanford, "BigDog, the Rough-Terrain Robot," video screen shots taken from https://www.youtube.com/watch?v=-Bi-tPO0OPs, Aug. 27, 2010, downloaded Apr. 26, 2024, 12 pages.
"Stanford EE Computer Systems Colloquium", The Wayback Machine, https://web.archive.org/web/20220807165701/https://web.stanford.edu/class/ee380/Abstracts/100512.html, downloaded Apr. 26, 2024, 1 page.

\* cited by examiner

CONTINUOUS SLIP RECOVERY

CROSS REFERENCE TO RELATED APPLICATIONS

This U.S. patent application is a continuation of, and claims priority under 35 U.S.C. § 120 from, U.S. patent application Ser. No. 16/889,035, filed on Jun. 1, 2020, which is a continuation of U.S. patent application Ser. No. 15/901, 419, filed on Feb. 21, 2018, now U.S. Pat. No. 10,688,667, which is a divisional of, and claims priority under 35 U.S.C. § 121 from, U.S. patent application Ser. No. 15/005,687, filed on Jan. 25, 2016, now U.S. Pat. No. 9,925,667. The disclosures of these prior applications are considered part of the disclosure of this application and are hereby incorporated by reference in their entireties.

TECHNICAL FIELD

This disclosure relates to mobile robots and mitigating slip of a robot appendage.

BACKGROUND

A legged robot is a robot that can walk and/or balance on one or more legs. Each leg may include one or more physical members connected by one or more joints, and one or more actuators that apply a force or torque to the physical member(s) and/or joint(s) to move and position the robot. Each leg may further include a foot that contacts the ground as the robot walks and/or balances in a given environment.

Legged robots may be utilized in a wide variety of environments. Some environments may be difficult for a legged robot to traverse due to, for example, a slippery surface, loose particles, slopes, and/or other surface conditions, which might cause one or more of the robot's feet to slip. When a robot's foot slips, the kinematic and energetic performance of the robot may be degraded. Other appendages of a robot (e.g., an end effector) may also slip with respect to an object or surface in the environment, degrading robot performance in a similar manner.

SUMMARY

This disclosure provides for systems and methods that can mitigate slip of a robot appendage (e.g., a foot, an end effector, etc.). In particular, the disclosure provides for systems and methods that apply forces to the appendage based, at least in part, on an appendage position and a filter position determined for the appendage. The disclosure further provides for dynamically adjusting the filter position based on one or more conditions to thereby dynamically adjust the applied force in a manner that efficiently and effectively arrests appendage movement during a slip event.

The appendage position can be a recently measured (e.g., most recently measured) position of the appendage (e.g., an instantaneous position). The filter position can be a virtual position that tracks and/or follows the movement of the appendage. In some embodiments, the filter position initially represents the initial touchdown position of the appendage so that any difference between the filter position and further measurements of the appendage position before liftoff (which may imply that the appendage is slipping) can be used as input for force adjustment. The filter position may also be updated to be no more than a threshold distance from the most recently measured appendage position. This allows the robot to mitigate potential slippage without over-correcting. Other embodiments and uses of the filter position may be possible as described below.

In one aspect, a method for mitigating slip of a robot appendage includes (i) receiving an input from one or more sensors, (ii) determining, based on the received input, an appendage position of the robot appendage, (iii) determining a filter position for the robot appendage, (iv) determining a distance between the appendage position and the filter position, (v) determining, based on the distance, a force to apply to the robot appendage, (vi) causing one or more actuators to apply the force to the robot appendage, (vii) determining whether the distance is greater than a threshold distance, (viii) responsive to determining that the distance is greater than the threshold distance, the control system adjusting the filter position to a position, which is the threshold distance from the appendage position, for use in a next iteration, and (ix) responsive to determining that the distance is not greater than the threshold distance, maintaining the determined filter position for use in the next iteration of the method.

In another aspect, a robotic system includes a body, an appendage coupled to the body, one or more actuators coupled to the appendage, one or more sensors, and a control system communicatively coupled to the one or more sensors and the one or more actuators. The control system is configured to iteratively carry out a plurality of operations to mitigate slip of the appendage. For each iteration, the control system is configured to (i) receive an input from the one or more sensors, (ii) determine, based on the input, an appendage position of the appendage, (iii) determine a filter position for the appendage, (iv) determine a distance between the appendage position and the filter position, (v) determine, based on the distance, a force to apply to the appendage, (vi) cause the one or more actuators to apply the determined force to the appendage, (vii) determine whether the distance is greater than a threshold distance, (viii) responsive to a determination that the distance is greater than the threshold distance, adjust the filter position to a position, which is the threshold distance from the appendage position, for use in a next iteration, and (ix) responsive to a determination that the distance is not greater than the threshold distance, maintain the determined filter position for use in the next iteration.

In yet another aspect, a method for mitigating slip of a robot foot includes (i) determining a first appendage position of a robot appendage, (ii) determining a first filter position for the robot appendage, (iii) determining a first distance between the first appendage position and the first filter position, (iv) determining, based on the first distance, a first force to apply to the robot appendage, (v) causing one or more actuators to apply the first force to the robot appendage, (vi) determining that the first distance is greater than a threshold distance, and (vii) responsive to determining that the first distance is greater than the threshold distance, adjusting the first filter position to a second filter position spaced from the first appendage position by the threshold distance, (viii) after determining the first appendage position, determining a second appendage position of the robot appendage, (ix) determining a second distance between the second appendage position and the second filter position, (x) determining, based on the second distance, a second force to apply to the robot appendage, and (xi) causing the one or more actuators to apply the second force to the robot appendage. The second force is different than the first force.

These as well as other aspects, advantages, and alternatives will become apparent to those of ordinary skill in the art by reading the following detailed description with reference where appropriate to the accompanying drawings.

Further, it should be understood that the description provided in this summary section and elsewhere in this document is intended to illustrate the claimed subject matter by way of example and not by way of limitation.

DETAILED DESCRIPTION

Figure 1:
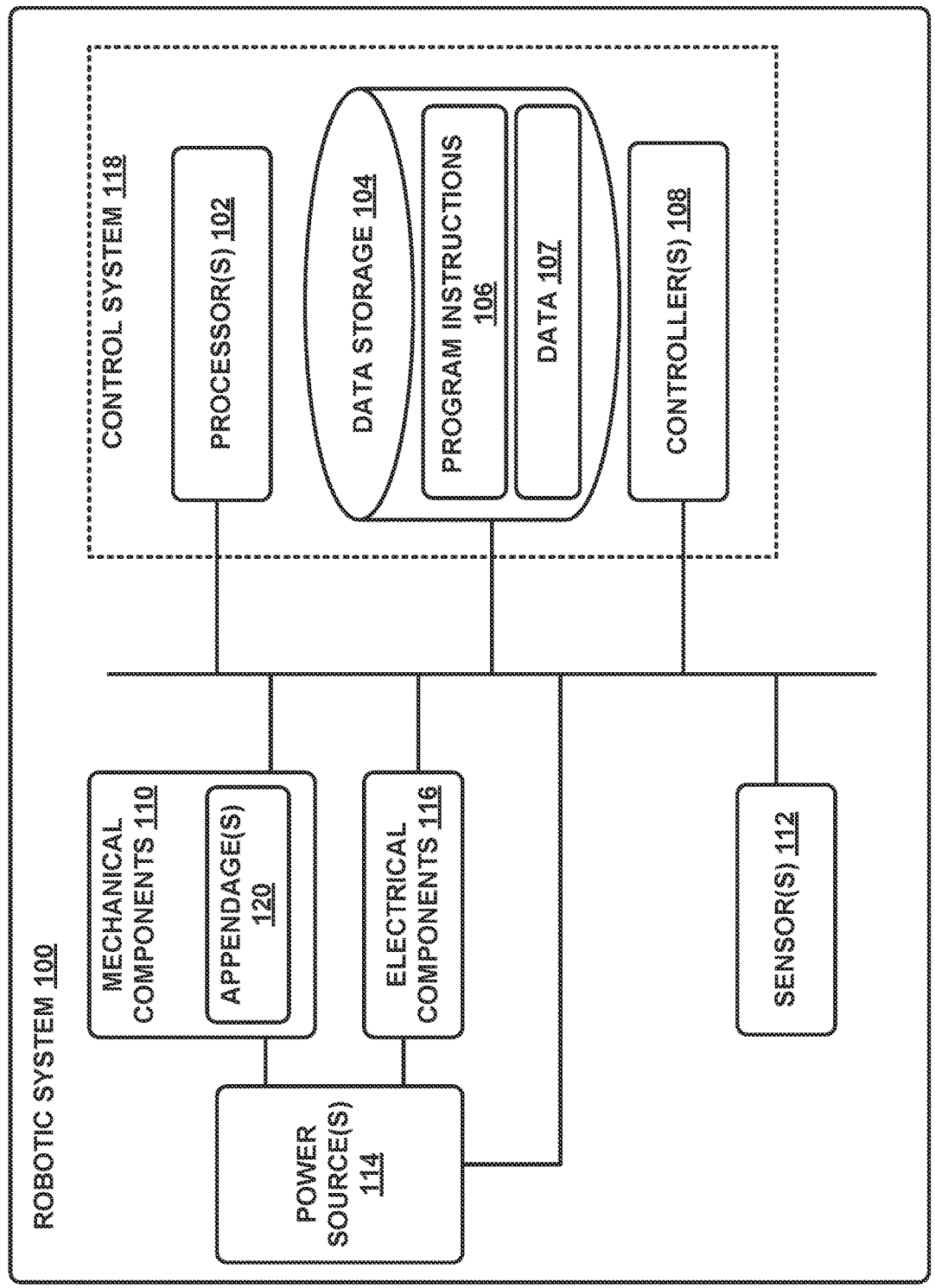
FIG. 1 illustrates a configuration of a robotic system according to an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

When a robot operates in some environments, one or more the robot's appendages may slip. In general, a robot's appendage may slip when a friction force between the appendage and a surface (e.g., a ground surface) is insufficient to maintain the appendage's position on the surface. For instance, a robot's foot or end effector may slip on a wet surface, a muddy surface, a greasy surface, an oily surface, a surface having loose particles (e.g., gravel), a sloped surface (e.g., a grassy hill), a loose, unanchored surface (e.g., a loose, unanchored rug or mat), and/or other surfaces having a low coefficient of friction.

A slipping appendage can cause a number of problems for a robot. For example, in a severe slip scenario, the robot may lose its balance and fall to the ground. However, even in less severe slip scenarios, a slipping appendage may degrade performance of the robot. For instance, a slipping foot may provide less forward thrust and/or vertical lift to the robot when attempting to move in some slip scenarios. Thus, in such scenarios, it may take more time and the robot may need to expend more energy to achieve a desired movement or positioning. Additionally, for instance, a slipping foot may place the robot in an unintended or undesirable position within the environment in which it is operating.

Example embodiments provide systems and methods for mitigating slip of a robot appendage. Within some examples, a robotic system includes a body having one or more appendages such as, for instance, feet and/or end effectors. In some implementations, the robotic system includes two or more legs that extend downwardly from the body to a ground surface. Each leg may include one or more members connected by joints and configured to operate with various degrees of freedom with respect to one another. Each leg may also include a foot, which may contact the ground surface. The legs and feet can balance the robotic system on the ground surface. Additionally, the legs and feet enable the robotic system to move at various speeds according to mechanics for one or more different gaits.

In additional or alternative implementations, the robotic system includes one or more movable arms on which an end effector is attached. The end effector may take a number of different forms depending on the type of task that is to be performed by the robot. For example, a robot designed to pick up, move, and set down objects may include a gripper having a plurality of gripper fingers that controllably open and close. Other examples are also possible.

The robotic system may further include a control system that performs operations to cause the robotic system to interact with or move within an environment. In practice, each appendage may be in a swing state or a stance state. In the swing state, the appendage moves through or is positioned in free space and, in the stance state, the appendage contacts a surface (e.g., a ground surface) to support the body. To operate the robotic system in a given environment, each appendage may transition between the swing state and the stance state one or more times. A slip may occur, for example, when the appendage transitions into the stance state at an initial touchdown position on a surface and then, while still in the stance state, the appendage experiences unintended movement from the initial touchdown position.

In one aspect, the control system performs an iterative process that can help to mitigate slip of a robot appendage. In each iteration of the process, the control system can (i) receive one or more inputs from the one or more sensors, (ii) determine an appendage position of the appendage based on the input(s), (iii) determine a filter position of the appendage, (iv) determine a distance between the appendage position and the filter position, (v) determine a force based on the determined distance, and then (vi) cause the force to be applied to the robot foot.

In each iteration of the process, the control system can also decide whether to adjust the filter position for use in a next iteration of the process. If the decision is to do so, the control system can adjust the filter position to an adjusted filter position, which then may be used in a next iteration of the process. Whereas, if the decision is to not adjust the filter position, then the control system can maintain the filter position so that it may be used again in the next iteration of the process. The control system may thus use the outcome of one iteration to determine the filter position for a next iteration. Stated differently, the control system may determine the filter position during a given iteration based on an outcome of the immediately preceding iteration.

In some aspects, to determine whether to adjust the filter position, the control system determines whether the distance between the appendage position and the filter position is greater than a threshold distance. If the control system determines that the distance is not greater than the threshold distance, the control system maintains the filter position for use in the next iteration. Whereas, if the control system determines that the distance is greater than the threshold distance, the control system adjusts the filter position for use in the next iteration.

In some examples, the control system can adjust the filter position based on the appendage position, the filter position, and/or the threshold distance. For instance, in one implementation, the control system can adjust the filter position by determining an adjusted position that is (i) collinear with the appendage position and the filter position, (ii) between the appendage position and the filter position, and (iii) spaced from the appendage position by the threshold distance. In another implementation, the control system can determine an adjusted filter position that is spaced from the appendage position by the threshold distance. Other examples may also be possible.

In some examples, the control system determines the force to apply to the appendage based on a virtual spring having a spring constant, K. The virtual spring can be considered to be anchored to the filter position and extend to the appendage position for a given iteration. In this way, the virtual spring applies a force to the appendage that generally urges the appendage from the appendage position toward the filter position. By dynamically adjusting the filter position over multiple iterations of the process, the control system dynamically adjusts the applied force in a manner that efficiently and effectively arrests appendage movement during a slip event.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as appendage(s) 120 (e.g., leg(s), feet, arm(s), end effector(s), etc.) and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
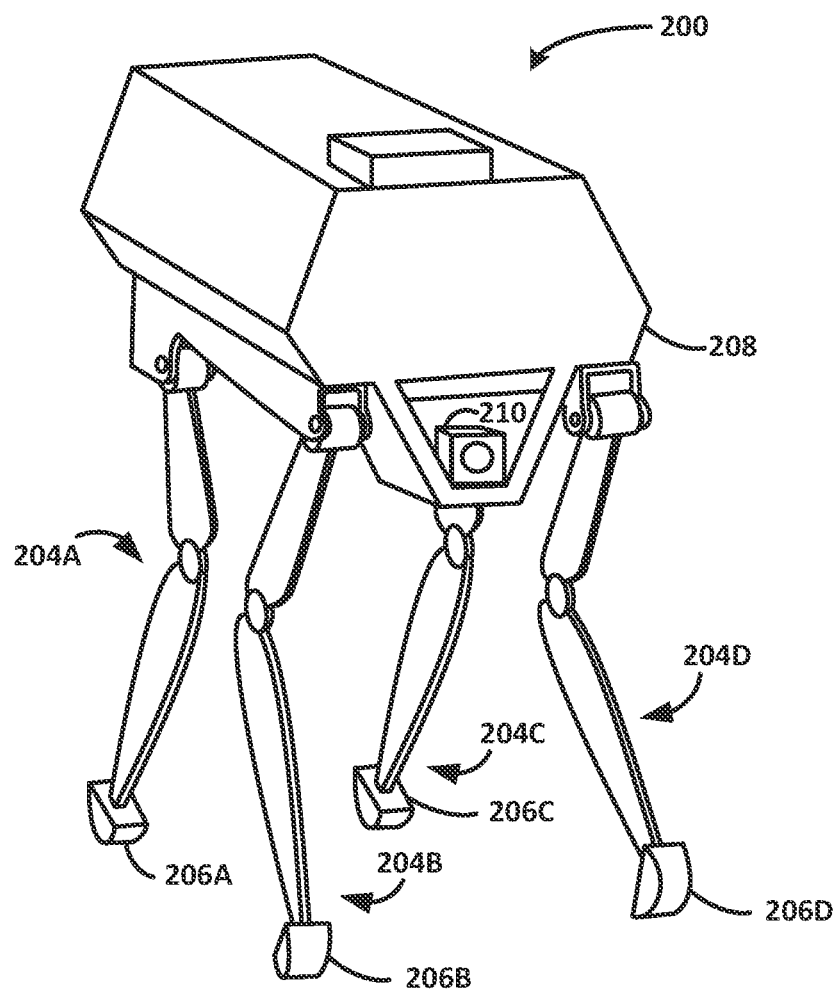
FIG. 2 illustrates a quadruped robot according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
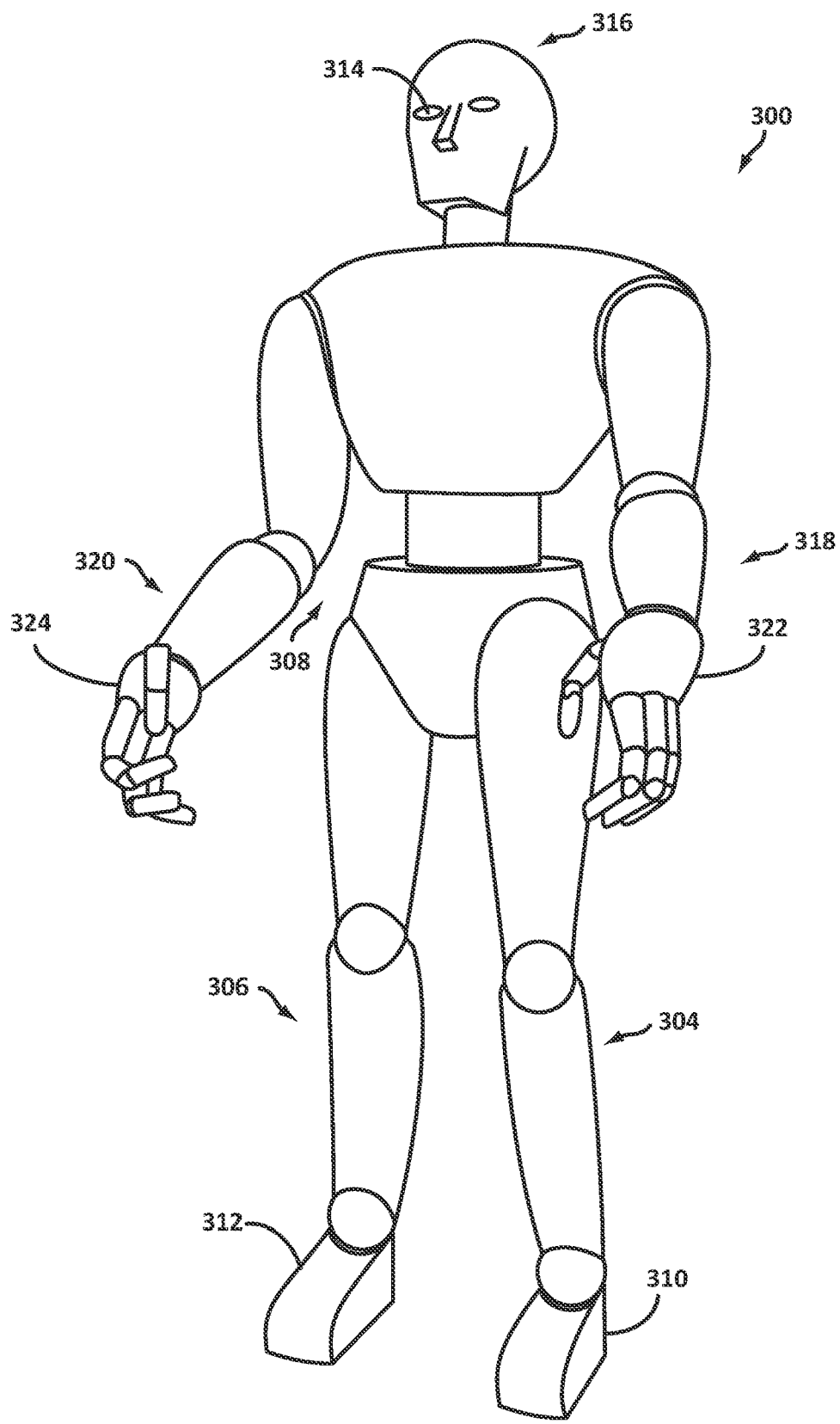
FIG. 3 illustrates a biped robot according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. EXAMPLE SLIP MITIGATION OPERATIONS

Example operations and processes for mitigating slip of a robot appendage will now be described. These operations and processes can be carried out by any of the robotic systems described above (including, e.g., the robotic systems 100, 200, and 300). For simplicity, however, the operations and processes will be described here with reference to the robotic system 100 of FIG. 1.

According to the disclosure, the control system 118 of the robotic system 100 carries out an iterative process to determine forces that can be applied to a robot appendage 120 to mitigate slip of the robot appendage 120. For each iteration of the process, the control system 118 determines the force to apply to the appendage 120 based, at least in part, on a filter position determined by the control system for the appendage. The control system 118 can determine and dynamically adjust the filter position based on one or more conditions that may be indicative of whether and/or to what extent the robot appendage 120 may be slipping. This allows the control system 118 to dynamically determine, for each iteration of the process, a force that is appropriately tuned to the robot appendage's specific slip mitigation needs at that particular time.

In one aspect, for each iteration of the process, the control system 118 (i) receives one or more inputs from the one or more sensors 112, (ii) determines an appendage position of the appendage 120 based on the input(s), (iii) determines a filter position for the appendage 120, (iv) determines a distance between the appendage position and the filter position, (v) determines a force based on the determined distance, and then (vi) causes one or more actuators to apply the force to the robot appendage 120.

In some aspects, for each iteration, the control system 118 further determines whether to adjust the filter position of the appendage 120 for the next iteration or maintain the filter position of the appendage 120 for the next iteration without adjustment. To do so, the control system 118 determines whether the distance between the appendage position and the filter position is greater than a threshold distance. If the control system 118 determines that the distance is not greater than the threshold distance, the control system 118 maintains the filter position for the next iteration. Whereas, if the control system 118 determines that the distance is greater than the threshold distance, the control system 118 adjusts the filter position for the next iteration.

In some examples, the control system 118 can adjust the filter position based on the appendage position, the filter position, and/or the threshold distance. In one implementation, the control system 118 can adjust the filter position by determining an adjusted position that is (i) collinear with the appendage position and the filter position, (ii) between the appendage position and the filter position, and (iii) spaced from the appendage position by the threshold distance.

In such an implementation, the control system 118 can be conceptually considered to utilize a virtual string to determine the filter position. For instance, the virtual string can have a length equal to the threshold distance, and the virtual string can be attached at opposing ends to the appendage position and the filter position. In this arrangement, when the distance between the appendage position and the filter position exceeds the threshold distance, the virtual string drags the filter position in the direction of the appendage position. Dragging the filter position using the virtual string causes the filter position to move to an adjusted position that is (i) collinear with the appendage position and the filter position, (ii) between the appendage position and the filter position, and (iii) spaced from the appendage position by the threshold distance.

On the other hand, if the distance is not greater than the threshold distance, the virtual string will not drag the filter position due to slack in the virtual string between the appendage position and the filter position. As such, the control system 118 maintains the filter position in its position when the distance is not greater than the threshold distance.

To further illustrate, FIGS. 4A-4D show graphical representations of filter position determinations for four example iterations of the process according to some aspects. FIGS. 4A-4D each show an appendage position $IP_i$ and a filter position $FP_i$ for an iteration i corresponding to that Figure. Additionally, FIGS. 4A-4D show a circle 402 with a center at the appendage position $IP_i$ and a radius equal to the threshold distance TD. In the illustrated examples, the appendage and filter positions are shown as two-dimensional coordinates; however, the control system 118 can determine and process the appendage and filter positions as one-dimensional or three-dimensional coordinates in other examples. For instance, in a three-dimensional coordinate example, the circle 402 can be represented by a sphere having a radius equal to the threshold distance TD.

Figure 4A:
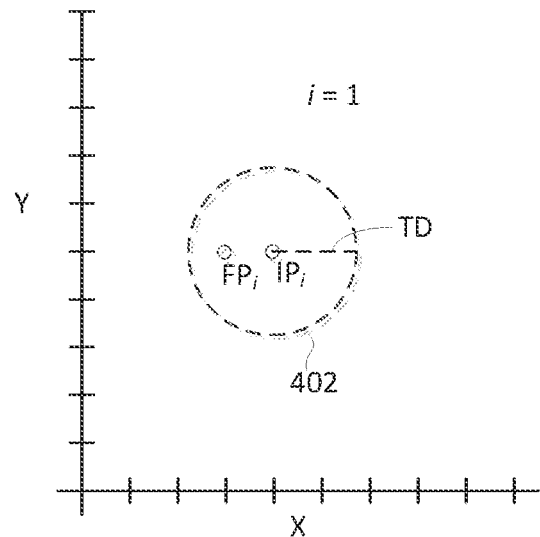
FIGS. 4A-4E illustrate graphical representations of filter position determinations for a robot appendage according to an example implementation.

FIG. 4A illustrates the appendage position $IP_{i=1}$ and the filter position $FP_{i=1}$ for the first iteration i=1 of the process. As shown in FIG. 4A, the filter position $FP_{i=1}$ is within the circle 402 and, thus, the distance between the appendage position $IP_{i=1}$ and the filter position $FP_{i=1}$ is less than the threshold distance for the first iteration i=1. As such, the control system 118 maintains the filter position $FP_{i=1}$ for use in the second iteration i=2. Accordingly, in FIG. 4B, the filter position $FP_{i=2}$ is in the same position shown for the filter position $FP_{i=1}$ in FIG. 4A.

Figure 4B:
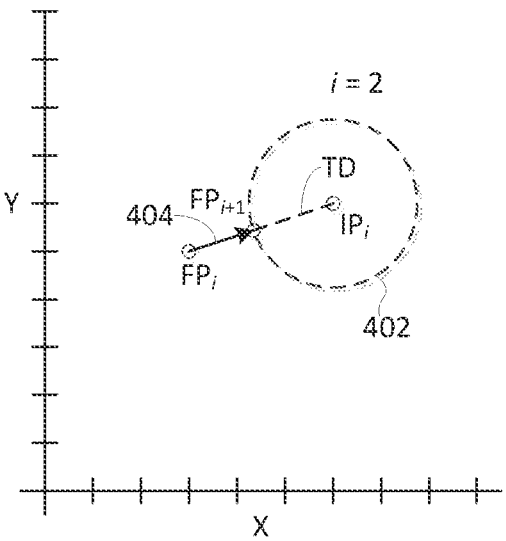

FIG. 4B further shows the appendage position $IP_{i=2}$ determined by the control system 118 for the second iteration (e.g., based on input(s) received from the sensor(s) 112 for the second iteration). As shown in FIG. 4B, the filter position $FP_{i=2}$ is outside of the circle 402 and, thus, the distance between the appendage position $IP_{i=2}$ and the filter position $FP_{i=2}$ is greater than the threshold distance TD. As a result, the control system 118 adjusts the filter position to an adjusted filter position $FP_{i=3}$ for use in the third iteration i=3. An arrow 404 conceptually illustrates this adjustment as the result of a virtual string TD attached to the appendage position $IP_{i=2}$ dragging the filter position from $FP_{i=2}$ to $FP_{i=3}$. As shown in FIG. 4B, the adjusted filter position $FP_{i=3}$ is (i) collinear with the appendage position $IP_{i=2}$ and the filter position $FP_{i=2}$, (ii) between the appendage position $IP_{i=2}$ and the filter position $FP_{i=2}$, and (iii) spaced from the appendage position $IP_{i=2}$ by the threshold distance TD.

Figure 4D:
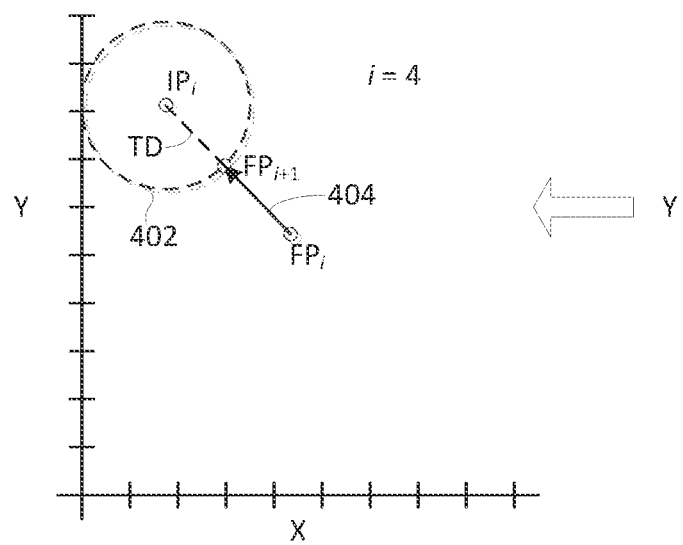
Figure 4C:
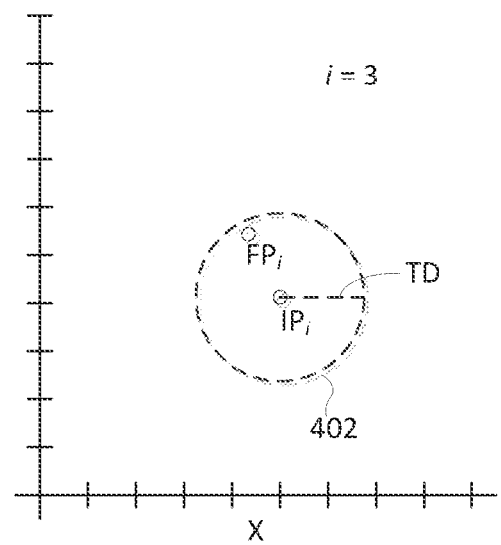

FIG. 4C shows the appendage position $IP_3$ and the filter position $FP_{i=3}$ for the third iteration i=3. As shown in FIG. 4C, the filter position $FP_{i=3}$ is shown in the same position as shown in FIG. 4B. In FIG. 4C, the filter position $FP_{i=3}$ is within the circle 402 and, thus, the control system 118 maintains the filter position $FP_{i=3}$ for use in the fourth iteration i=4. Accordingly, in FIG. 4D, the filter position $FP_{i=4}$ is in the same position shown for the filter position $FP_{i=3}$ in FIG. 4C.

FIG. 4D further shows the appendage position $IP_{i=4}$ determined for the fourth iteration i=4. As shown in FIG. 4D, the filter position $FP_{i=4}$ is outside of the circle 402 and, thus, the distance between the appendage position $IP_{i=4}$ and the filter position $FP_{i=4}$ is greater than the threshold distance TD. As a result, the control system 118 adjusts the filter position to an adjusted filter position $F_{i=5}$ for use in the next iteration. An arrow 404 conceptually illustrates this adjustment as the result of a virtual string TD attached to the appendage position $IP_{i=4}$ dragging the filter position from $FP_{i=4}$ to $F_{i=5}$. The adjusted filter position $F_{i=5}$ is (i) collinear with the appendage position $IP_{i=4}$ and the filter position $FP_{i=4}$, (ii) between the appendage position $IP_{i=4}$ and the filter position $FP_{i=4}$, and (iii) spaced from the appendage position $IP_{i=4}$ by the threshold distance TD.

FIGS. 4B and 4D illustrate one example implementation for the control system 118 adjusting the filter position. The control system 118 may adjust the filter position in other ways in other examples. For instance, in an alternative example, the control system 118 can adjust the filter position to an adjusted position that is spaced from the appendage position by the threshold distance but may not be collinear with and/or between the appendage position and the filter position. In another alternative example, the control system 118 can adjust the filter position to an adjusted position that is spaced from the appendage position by a distance that is less than the threshold distance. Other examples may also be possible.

Figure 4E:
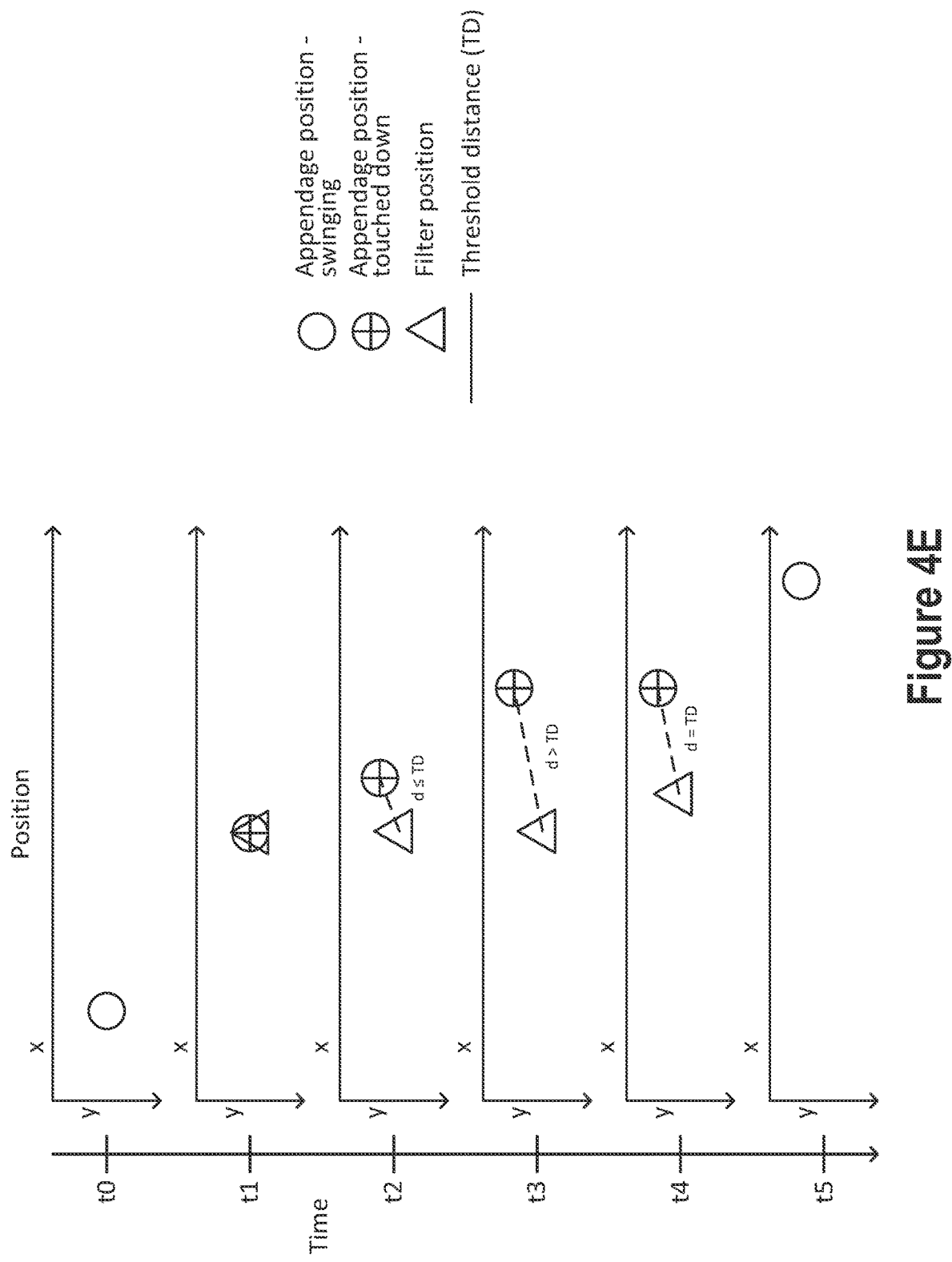

FIG. 4E shows another graphical representation of filter position determinations for some example iterations of the process, each at a respective time $t_0$-$t_5$, according to some aspects. At time to, the robot appendage 120 is in the swing state. At time $t_1$, the robot appendage 120 touched down and, thus, is in a stance state. As shown for time $t_1$, the appendage position and the filter position are the same at touch down in this example. At time $t_2$, while still in the stance state, the robot appendage 120 moved by a distance d that is less than the threshold distance TD. As such, the filter position is maintained for the next iteration (at time $t_3$). This movement of the appendage position at time $t_2$ may have been caused by appendage 120 slipping along a surface.

At time $t_3$, while still in the stance state, the robot appendage 120 moved further (possibly due to appendage 120 further slipping along the surface) such that the distance d between the filter position and the appendage position is now greater than the threshold distance TD. Accordingly, the filter position is adjusted to an adjusted position, which is the threshold distance TD from the appendage position at time $t_3$. This adjusted position of the filter position is shown for time $t_4$. In FIG. 4E, the appendage position at time $t_4$ remains the same as the appendage position at time $t_3$. Thus, the filter position is the threshold distance TD from the appendage position at time $t_4$. In this example, because the distance d between the filter position and the appendage position is not greater than the threshold distance TD at time $t_4$, the filter position is maintained for a next iteration. At time $t_5$, the appendage is again in the swing state.

As noted above, for each iteration i of the process, the control system 118 can determine a force $F_i$ to apply to the robot appendage 120 based on the distance $D_i$ between the appendage position $IP_i$ and the filter position $FP_i$ determined for that iteration i. In some examples, the control system 118 further determines the force $F_i$ based on a virtual spring having a spring constant, K. The virtual spring can be anchored to the filter position $FP_i$ and extend to the appendage position $IP_i$ for a given iteration i. In this way, the virtual spring applies the force $F_i$ to the robot appendage 120 in a manner that generally urges the robot appendage 120 toward the filter position $FP_i$.

In some additional examples, the control system 118 can further determine the force $F_i$ based on a virtual damper and a velocity of the robot appendage 120 (e.g., an instantaneous velocity). In one example implementation, the control system 118 can use the following equation to determine the force $F_i$ to be applied to the robot appendage 120:

$$F_i = -K*(IP_i - FP_i) - C(v_i) \quad \text{(Equation 1)}$$

where K is a spring constant, $IP_i$ is the appendage position, $FP_i$ is the filter position, C is a viscous damping gain constant, and $v_i$ is an velocity of the robot appendage 120 determined by the control system 118 for iteration i.

If the robot appendage 120 is not slipping, then the distance $D_i$ (i.e., $IP_i - FP_i$) and the velocity $v_i$ will be relatively small (or possibly zero). As a result, using Equation 1, the control system 118 will determine a relatively small (or zero) force $F_i$ to apply to the robot appendage 120 when the appendage 120 is not slipping. Whereas, if the robot appendage 120 is slipping, the distance $D_i$ between the appendage position $IP_i$ and the velocity $v_i$ will be relatively greater. As a result, using Equation 1, the control system 118 will determine a relatively greater force $F_i$ to apply to the robot appendage 120 when the appendage 120 is slipping.

As noted above, the control system 118 can determine the appendage position $IP_i$ and the filter position $FP_i$ as one-dimensional, two-dimensional, or three-dimensional coordinates. The control system 118 can utilize Equation 1 in two-dimensional coordinate and/or three-dimensional coordinate implementations as well. For instance, in a two-dimensional coordinate implementation, the control system 118 can employ Equation 1 in the following form:

$$\begin{bmatrix} F_{i,x} \\ F_{i,y} \end{bmatrix} = -\begin{bmatrix} K_{xx} & K_{xy} \\ K_{yx} & K_{yy} \end{bmatrix} \begin{bmatrix} IP_{i,x} - FP_{i,x} \\ IP_{i,y} - FP_y \end{bmatrix} - \begin{bmatrix} C_{xx} & C_{xy} \\ C_{yx} & C_{yy} \end{bmatrix} \begin{bmatrix} v_{i,x} \\ v_{i,y} \end{bmatrix} \quad \text{(Equation 2)}$$

where $F_{i,x}$ is the force in the x-dimension, $F_{i,y}$ is the force in the y-dimension, the appendage position is at coordinate ($IP_{i,x}$, $IP_{i,y}$), the filter position is at coordinate ($FP_{i,x}$, $FP_{i,y}$), $v_{i,x}$ is the velocity in the x-dimension, $v_{i,y}$ is the velocity in the y-dimension, ($K_{xx}$, $K_{xy}$, $K_{yx}$, $K_{yy}$) are the spring constants, and ($C_{xx}$, $C_{xy}$, $C_{yx}$, $C_{yy}$) are viscous damping gain constants.

In some aspects, the control system 118 can carry out the process in real-time to mitigate slip of the robot appendage 120. In one example, the control system 118 can perform approximately 50 iterations to approximately 1500 iterations per second. In another example, the control system 118 can perform approximately 200 iterations to approximately 600 iterations per second.

In some aspects, the control system 118 can continuously carry out the process while the robotic system 100 is operated. As noted above, during operation of the robotic system 100, a robot appendage 120 may be in a swing state or a stance state at a given time. In the swing state, the robot appendage 120 moves through or is positioned in free space. In the stance state, the robot appendage 120 contacts a surface of the environment (e.g., the ground surface) to provide support to the robotic system 100. Thus, in some aspects, the control system 118 can continuously carry out the iterative process for a robot appendage 120 in both the swing and stance states.

Figure 5:
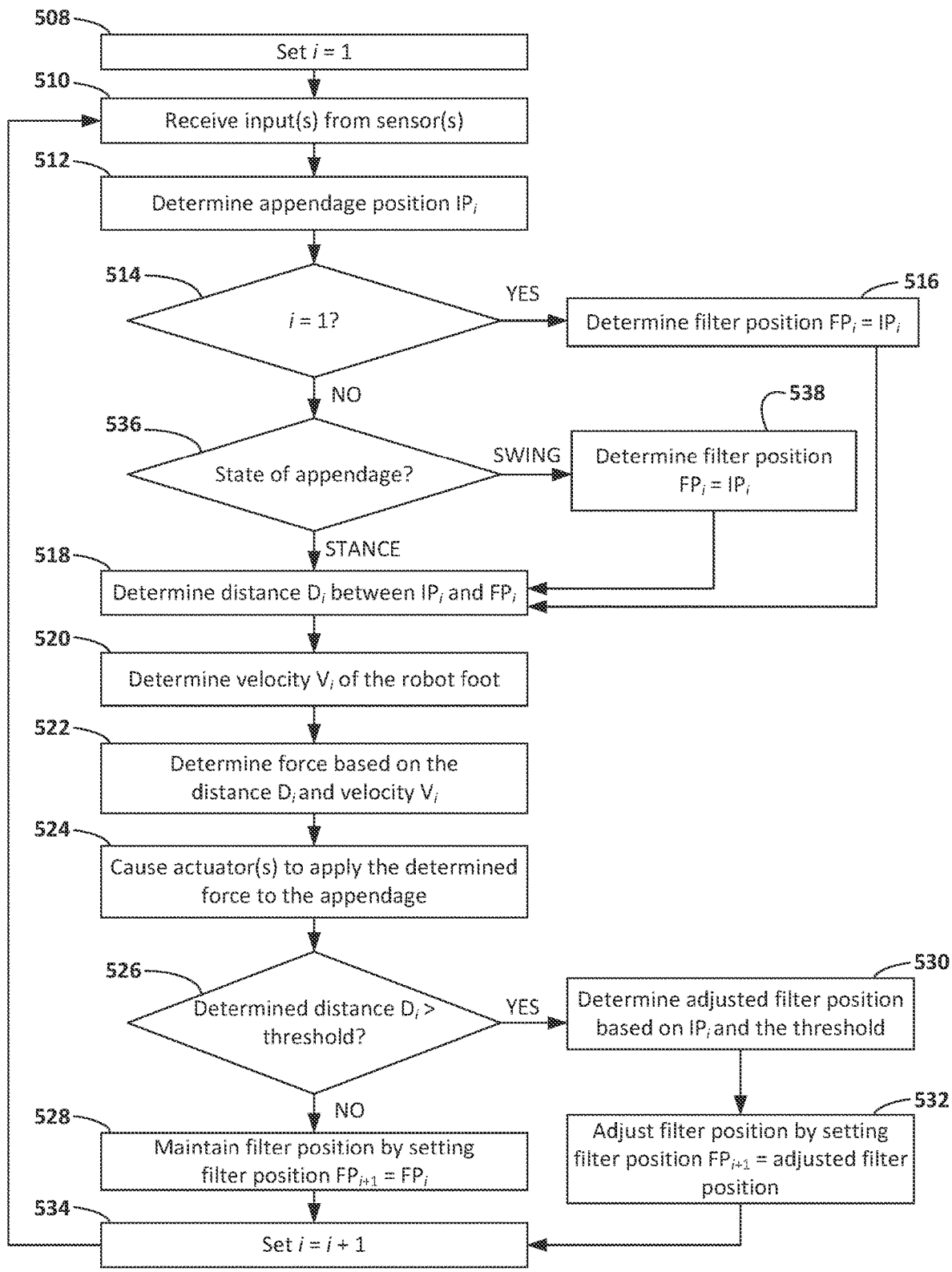
FIG. 5 illustrates a flowchart for mitigating slip of a robot appendage according to an example implementation.

FIG. 5 illustrates a flowchart for mitigating slip of a robot appendage 120 according to one example embodiment. The example process illustrated in FIG. 5 can be iteratively performed by the control system 118 in a continuous manner while the robotic system 100 is operated. The control system 118 may perform the example process independently for some or all appendages 120 of the robotic system 100; however, the process will be described here with respect to a single robot appendage 120 for simplicity. As shown in FIG. 5, the process begins at block 508 with the control system 118 setting an iteration number i to an initial value such as, for example, 1.

At block 510, the control system 118 receives one or more inputs from the one or more sensors 112 including sensor data as described above. At block 512, the control system 118 determines, based on the input(s) received from the sensor(s) 112, an appendage position $IP_i$ of the robot appendage 120 for the current iteration i of the process. In some examples, the input(s) may explicitly indicate the appendage position $IP_i$ of the appendage 120 to the control system 118 (e.g., in examples in which the sensor(s) 112 include a GPS sensor, etc.). In additional or alternative examples, the control system 118 can determine the appendage position $IP_i$ from the input(s) based on a forward kinematics analysis and/or other processing (e.g., based, in part, on prior position information for the robot appendage 120 and/or a priori knowledge of the environment in which the robotic system 100 is operating). More generally, the appendage position $IP_i$ can be determined based, at least in part, on input(s) indicating sensor data provided by any of the types of sensors 112 described above with respect to FIG. 1.

In some aspects, the control system 118 can employ a coordinate system (e.g., a Cartesian coordinate system, a GPS coordinate system, etc.) to provide a frame of reference for determining the appendage position $IP_i$ of the appendage 120. The control system 118 can determine the appendage position $IP_i$ as a one-dimensional coordinate, a two-dimensional coordinate, or a three-dimensional coordinate with respect to the coordinate system. The number of dimensions determined by the control system 118 for the appendage position $IP_i$ may depend on, for example, the number of degrees of freedom for appendage movement, the type of terrain in the operational environment of the robotic system 100, and/or other robot design criteria.

In some implementations, the appendage position $IP_i$ can be at point on a surface of the appendage 120 (e.g., a bottom surface of the appendage 120) that is configured to be in contact with a surface of the environment when the appendage 120 is in the stance state (e.g., a ground surface). In one example, the appendage position $IP_i$ may be at the geometric center of that surface of the appendage 120. In other examples, the appendage position $IP_i$ can be in a different location on the appendage 120.

At block 514, the control system 118 determines whether the current iteration i is the first iteration of the process (e.g., whether i=1). If the control system 118 determines that the current iteration i is the first iteration at block 514, then at block 516 the control system 118 determines a filter position $FP_i$ by setting the appendage position $IP_i$ determined for the current iteration i (at block 512) as the filter position $FP_i$. Thus, the control system 118 uses the initial appendage position $IP_{i=1}$ as an initial filter position $FP_{i=1}$ in this example.

Then, at block 518, the control system 118 determines a distance $D_i$ between the appendage position $IP_i$ and the filter position $FP_i$ determined for the current iteration i. For the first iteration of the process, the distance $D_i$ is zero because the appendage position $IP_i$ and the filter position $IP_i$ are the same. The distance $D_i$ may be a non-zero value for at least some subsequent iterations of the process.

At block 520, the control system 118 determines, based on the input(s) received from the sensor(s) 112 at block 510, a velocity $v_i$ of the robot appendage 120. At block 522, the control system 118 determines a force $F_i$ to apply to the robot appendage 120 for the current iteration i based on the distance $D_i$ determined at block 518 and the velocity $V_i$ determined at block 520. In general, the force $F_i$ determined by the control system 118 can be configured to pull the robot appendage 120 back toward the filter position $FP_i$. For example, the control system 118 can utilize Equation 1 or Equation 2 described above to determine the force $F_i$.

At block 524, the control system 118 causes the force $F_i$ determined at block 522 for the current iteration i to be applied to the robot appendage 120. For example, the control system 118 can provide one or more control signals to one or more of the actuators (described above with respect to the mechanical components 110) to cause the actuator(s) to apply the force $F_i$ to the appendage 120. As described above, the force $F_i$ applied to the robot appendage 120 may urge the appendage 120 in a direction from the appendage position $IP_i$ towards the filter position $FP_i$.

At block 526, the control system 118 determines whether the distance $D_i$ determined at block 518 is greater than a threshold distance. If the control system 118 determines that the distance $D_i$ is not greater than the threshold distance at block 526, then at block 528 the control system 118 sets the filter position $FP_i$ determined for the current iteration i as the filter position $FP_{i+1}$ for the next iteration i+1. In other words, the control system 118 maintains the filter position $FP_i$ for the next iteration i+1. Whereas, if the control system 118 determines that the distance $D_i$ is greater than the threshold distance at block 526, then at block 530 the control system 118 determines an adjusted filter position and, at block 532, the control system 118 sets the adjusted filter position as the filter position $FP_{i+1}$ for the next iteration i+1.

In some aspects, the control system 118 can determine the adjusted filter position based on the appendage position $IP_i$ for the current iteration and the threshold distance. For example, the control system 118 can determine the adjusted position by determining a position that is spaced from the appendage position by the threshold distance. Additionally or alternatively, for example, the control system 118 can determine the adjusted position by determining a position that is (i) collinear with the appendage position and the filter position, (ii) between the appendage position and the filter position, and (iii) spaced from the appendage position by the threshold distance. Other examples may also be possible.

After the control system 118 determines the filter position $FP_{i+1}$ for the next iteration at block 528 or block 530, the control system 118 increments the iteration number i at block 534 and returns to block 510 to begin the next iteration of the process. At block 510, the control system 118 receives input(s) from the sensor(s) 112 and, at block 512, the control system 118 determines the appendage position $IP_i$ based on input(s) received from the sensor(s) 112.

At block 514, the control system 118 determines that the current iteration i is not the first iteration and, thus, the process progresses to block 536. Note that the control system 118 progresses from block 512 to block 536 for each iteration after the first iteration.

At block 536, the control system 118 determines whether the robot appendage 120 is in the swing state or the stance state for the current iteration i. The control system 118 can determine whether the robotic system 100 is in the swing state or the stance state based on the input(s) received from the sensor(s) 112 at block 510.

As one example, the robot appendage 120 may include one or more pressure sensors 112 that can measure a pressure (if any) between the robot appendage 120 and a surface and provide sensor data indicative of the measured pressure to the control system 118. The control system 118 can receive input(s) indicating the measured pressure, compare the measured pressure to a pressure threshold, and determine the state of the appendage 120 based on the comparison. For instance, if the control system 118 determines that the measured pressure is greater than the pressure threshold, the control system 118 can determine that the appendage 120 is in the stance state. Whereas, if the control system 118 determines that the measured pressure is not greater than the pressure threshold, the control system 118 can determine that the appendage 120 is in the swing state. Other examples for are also possible.

If, at block 536, the control system 118 determines that the robot appendage 120 is in the swing state, then at block 538 the control system 118 determines the filter position $FP_i$ by setting the appendage position $IP_i$ determined for the current iteration i (at block 512) as the filter position $FP_i$ for the current iteration i. If, however, the control system 118 determines that the robot appendage 120 is in the stance state at block 536, then the control system 118 progresses to block 518 without making any changes to the filter position determined at either block 528 or block 532 during the immediately preceding iteration i−1. That is, if the appendage 120 is in the stance state, the control system 118 effectively determines the filter position $FP_i$ to be the outcome of the control system 118 adjusting or maintaining a prior filter position in the immediately preceding iteration i−1.

The control system 118 then determines the distance $D_i$ for the current iteration i at block 518, determines the velocity $v_i$ at block 520, determines the force $F_i$ at block 522, causes the actuator(s) to apply the determined force $F_i$ to the appendage 120 at block 524, determines whether the distance $D_i$ is greater than the threshold distance at block 526, and determines the filter position $FP_{i+1}$ for the next iteration i+1 at either block 528 or blocks 530, 532 (depending on the determination at block 526). The control system 118 then increments the iteration number i and returns to block 510 to repeat the process.

Depending on conditions experienced by the robot appendage 120 during operation of the robotic system 100, the control system 118 may dynamically adjust the filter position $FP_i$ for one or more iterations of the process. This can beneficial in a number of ways. For example, by dynamically adjusting the filter position $FP_i$ based on a threshold analysis, the control system 118 can filter out some noisy information that may be received from the sensor(s) 112 during operation. For instance, depending on the accuracy of the sensor(s) 112, the inputs may indicate small variations in the appendage position $IP_i$ even though the robot appendage 120 is not moving. Additionally, for instance, small variations in the appendage position $IP_i$ may be detected due to compliance between the robot appendage 120 and the ground in some non-slip event scenarios. When such variations are within the threshold distance, the control system 118 does not adjust the filter position $FP_i$. Among other things, this can help to ensure that noisy information from the sensor(s) 112 does not compromise slip mitigation force $F_i$ determinations based on the filter position $FP_i$.

Additionally, for example, because the filter position $FP_i$ is dynamically adjusted in a manner that tracks changes to the appendage position $IP_i$, the control system 118 can dynamically determine forces $F_i$ that can efficiently and effectively arrest appendage 120 movement with a reduced risk that such forces $F_i$ will cause further slip of the appendage 120. In other words, the dynamic adjustment of the filter position $FP_i$ can help to mitigate over-corrections, which may cause further slips.

In general, the filter position $FP_i$ is a virtual position utilized by the control system 118 to determine a force that, when applied to the robot appendage 120, can mitigate slip of the robot appendage 120. As described above, this virtual position can be based on one or more conditions that may be indicative of whether and/or to what extent the robot appendage 120 may be slipping. For instance, when the algorithm initializes at block 516 and/or when the robot appendage 120 is in the swing state at block 538, the robot appendage 120 is unlikely to (or cannot) slip. Accordingly, in those instances, the control system 118 can set the filter position $FP_i$ as the appendage position $IP_i$ such that a negligible force (or no force) is applied to the robot appendage 120 for that iteration of the algorithm. On the other hand, when the robot appendage 120 is in the stance state, the robot appendage 120 contacts a surface and, thus, it is possible that the robot appendage 120 may experience a slip. In such instances, the control system 118 can utilize the above-described threshold analysis (at blocks 526, 528, 530, 532, 534) to dynamically determine and adjust the filter position $FP_i$ in a manner that tracks relative changes to the appendage position $IP_i$ so as to efficiently and effectively mitigate slip with reduced risk of an over-correction.

In the example shown in FIG. 5, the control system 118 continuously carries out the process in both the swing state and the stance state. In alternative examples, the control system 118 can carry out the process for a robot appendage 120 of the robotic system 100 when the robot appendage 120 is in the stance state but not when the robot appendage 120 is in the swing state. That is, in such examples, the control system 118 can initialize the process responsive to the control system 118 detecting the appendage 120 transition from the swing state to the stance state and the control system 118 can terminate the process responsive to the control system 118 detecting the appendage 120 transition from the stance state back to the swing state.

Figure 6:
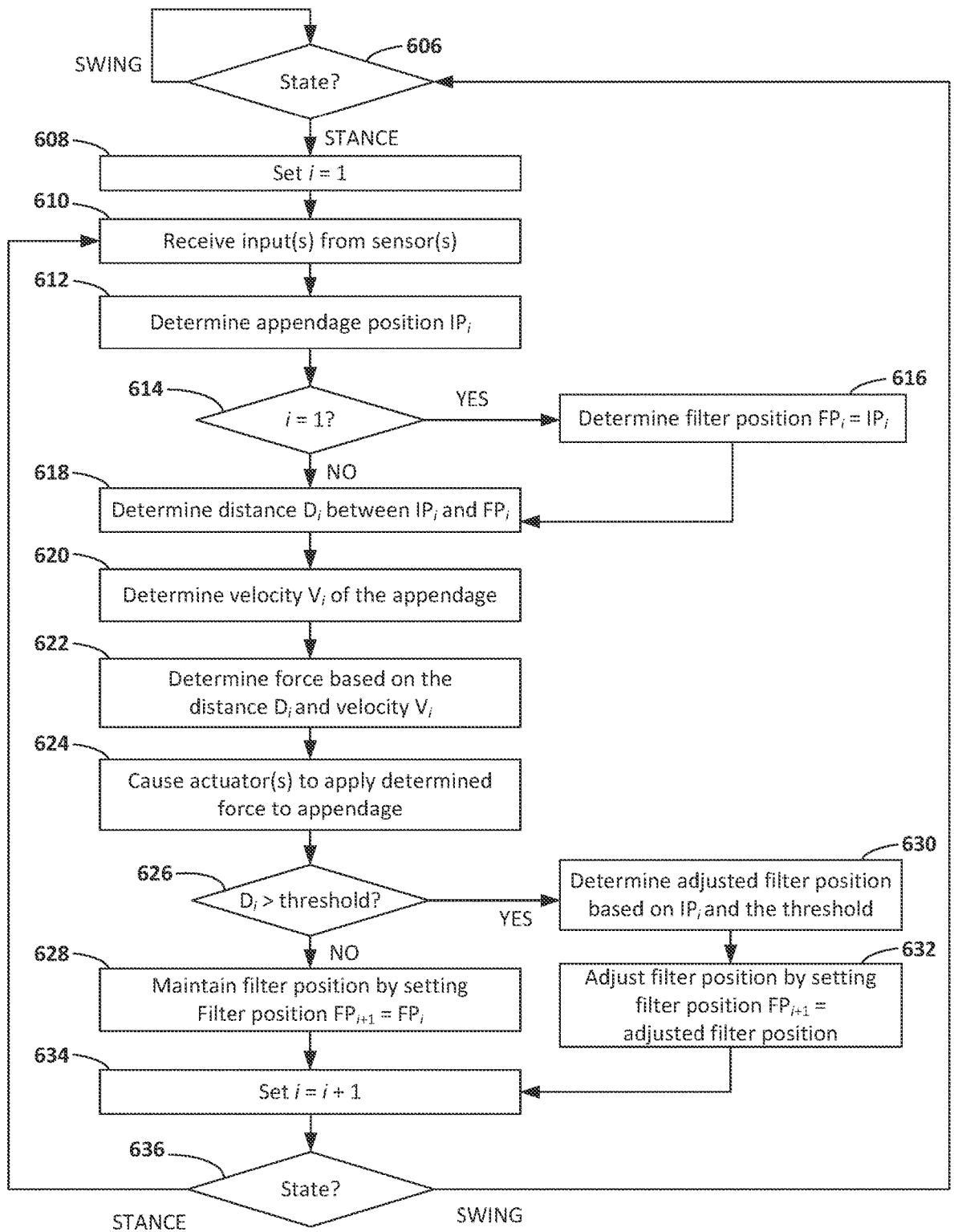
FIG. 6 illustrates a flowchart for mitigating slip of a robot appendage according to an example implementation.

FIG. 6 illustrates a flowchart for mitigating slip of a robot appendage 120 according to another example embodiment. The example process illustrated in FIG. 6 can be iteratively performed by the control system 118 in an intermittent manner while the robotic system 100 is operated. The control system 118 may perform the example process independently for some or all appendages 120 of the robotic system 100; however, the process will be described here with respect to a single robot appendage 120 for simplicity.

As shown in FIG. 6, the process begins at block 606 with the control system 118 determining whether the appendage 120 is in the swing state or the stance state. If the control system 118 determines that the appendage 120 is in the swing state, the control system 118 returns to block 606. Once the control system 118 determines that the appendage 120 is in the stance state, at block 608 the control system 118 sets an iteration number i to an initial value such as, for example, 1. Then at block 610 the control system 118 receives the input(s) from the sensor(s) 112 and the control system 118 determines, based on the input(s), an appendage position $IP_i$ of the appendage 120 at block 612.

At block 614, the control system 118 determines whether the iteration number i equals the initial value set at block 608. If the control system 118 determines that the iteration number i equals the initial value (i.e., if the current iteration i is the first iteration), then the control system 118 sets the appendage position $IP_i$ as the initial filter position $FP_i$ at block 616. Whereas, if the control system 118 determines that the iteration number i does not equal the initial value (i.e., if the current iteration i is not the first iteration), then the process proceeds to block 618 without modifying the filter position $FP_i$ determined during an immediately preceding iteration i−1.

At block 618, the control system 118 determines the distance $D_i$ between the appendage position $IP_i$ and the filter position $FP_i$. At block 620, the control system determines the velocity $v_i$ based on the input(s) received at block 610. At block 622, the control system determines the force $F_i$ based on the distance $D_i$ and the velocity $v_i$ as described above. At block 624, the control system 118 causes the determined force $F_i$ to be applied to the appendage 120.

At block 626, the control system 118 determines whether the distance $D_i$ is greater than the threshold distance. If the control system 118 determines that the distance $D_i$ is not greater than the threshold distance, then the control system 118 maintains the filter position $FP_{i+1}$ for the next iteration i+1 at block 628. Whereas, if the control system 118 determines that the distance $D_i$ is greater than the threshold distance, then the control system 118 determines an adjusted filter position at block 630 and sets the adjusted filter position as the filter position $FP_{i+1}$ for the next iteration i+1 at block 632.

After determining the filter position $FP_{i+1}$ for the next iteration i+1, the control system 118 increments the iteration number i at block 634. At block 636, the control system 118 determines whether the appendage 120 is in the swing state or the stance state. If the control system 118 determines that the appendage 120 is in the stance state at block 636, then the process returns to block 610 and repeats. Whereas, if the control system 118 determines that the appendage 120 is in the swing state at block 636, then the process returns to block 606 until the control system 118 next determines that the appendage 120 transitions to the stance state again.

Figure 7:
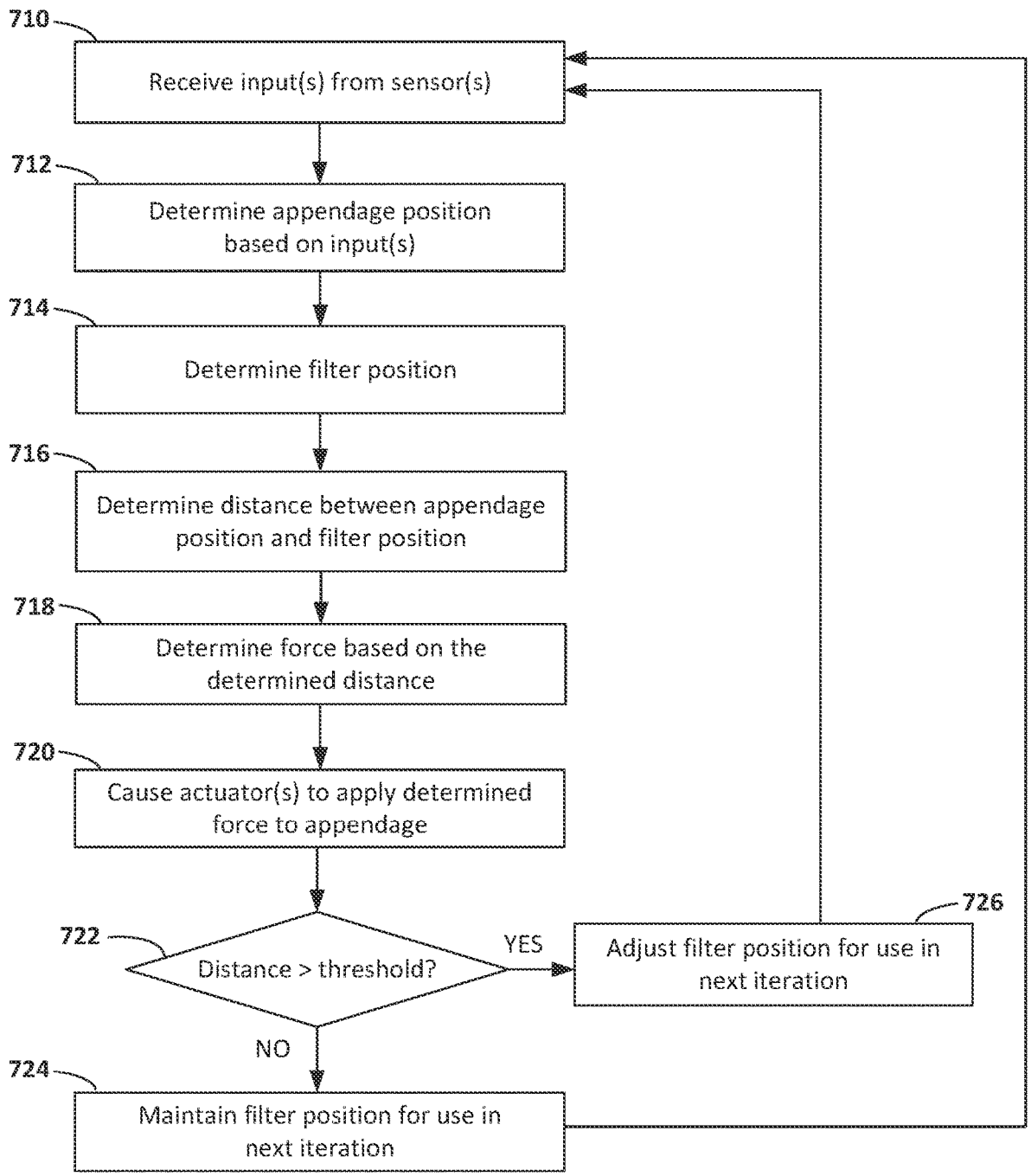
FIG. 7 illustrates a flowchart for mitigating slip of a robot appendage according to an example implementation.

FIG. 7 illustrates a flowchart for an iterative process of mitigating slip of a robot appendage 120 according to another example embodiment. An iteration of the process begins at block 710 with the control system 118 receiving one or more input(s) from one or more sensor(s) 112. At block 712, the control system 118 determines an appendage position (e.g., an instantaneous position) for the robot appendage 120 based on the input(s) received at block 710. At block 714, the control system 118 determines a filter position for the robot appendage 120. The control system 118 can determine the filter position based on an outcome of an immediately preceding iteration, a state of the appendage (e.g., swing or stance), and/or whether the current iteration is an initial iteration of the process as described above.

At block 716, the control system 118 determines a distance between the appendage position determined at block 712 and the filter position determined at block 714. At block 718, the control system 118 determines, based on the distance determined at block 716, a force to apply to the robot appendage 120 as described above. At block 720, the control system 118 causes one or more actuators to apply the force determined at block 718 to the appendage 120.

At block 722, the control system 118 determines whether the distance determined at block 716 is greater than a threshold distance. If the control system 118 determines that the distance is not greater than the threshold distance, then at block 724 the control system 118 maintains the filter position for use in a next iteration of the process. If the control system 118 determines that the distance is greater than the threshold distance, then at block 726 the control system 118 adjusts the filter position as described above. After block 724 or block 726, the process returns to block 710 so that the control system 118 can carry out the next iteration.

Figure 8:
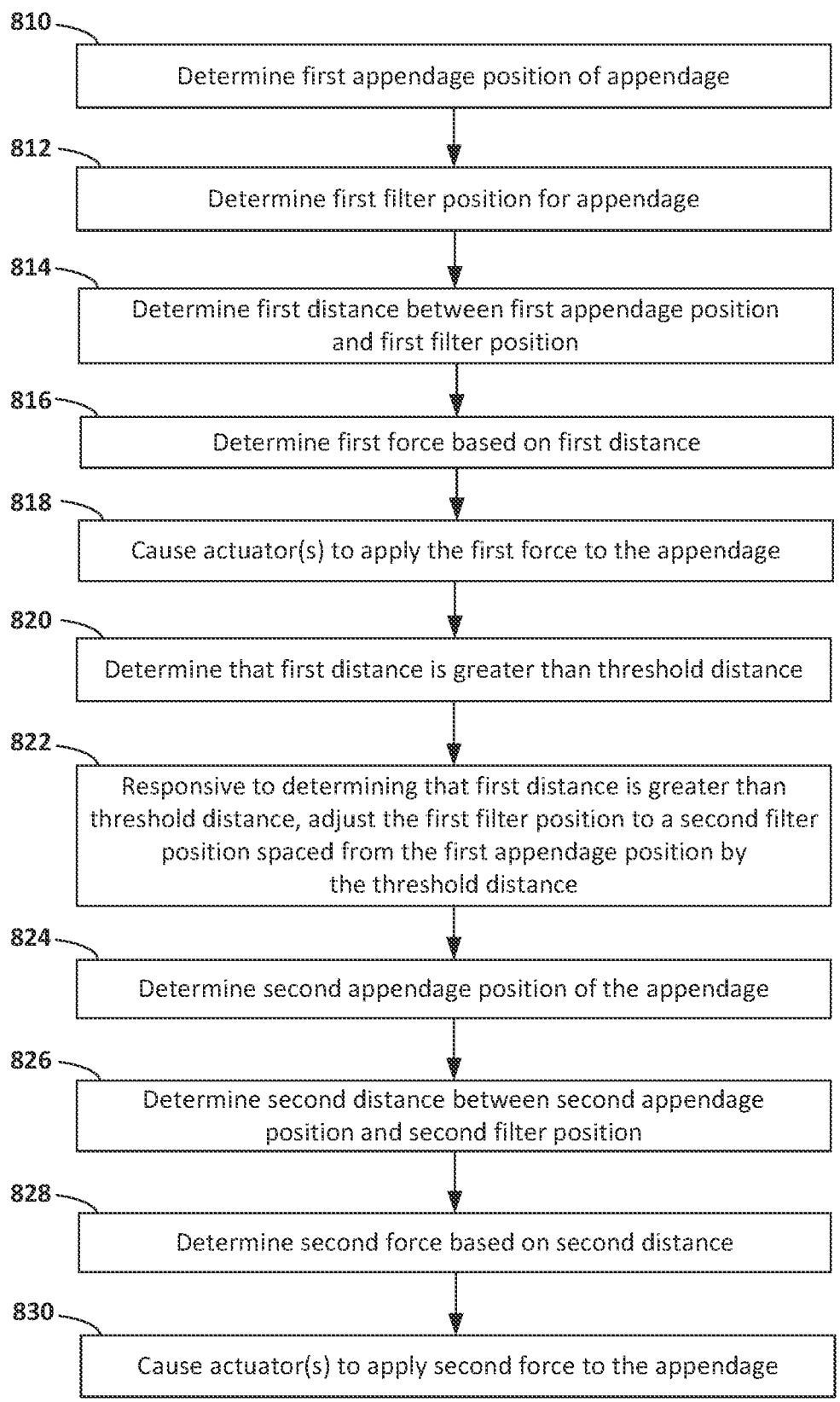
FIG. 8 illustrates a flowchart for mitigating slip of a robot appendage according to an example implementation.

FIG. 8 illustrates a flowchart for mitigating slip of a robot appendage 120 according to another example embodiment. The process begins at block 810 with the control system 118 determining a first appendage position (e.g., a first instantaneous position) of the robot appendage 120. The control system 118 can determine the first appendage positon based on one or more inputs received from sensor(s) 112. At block 812, the control system 118 determines a first filter position for the robot appendage 120.

At block 814, the control system 118 determines a first distance between the first appendage position determined at block 810 and the first filter position determined at block 812. At block 816, the control system 118 determines, based on the first distance, a force to apply to the robot appendage 120. At block 818, the control system 118 causes one or more actuators to apply the first force to the robot appendage 120.

At block 820, the control system 118 determines that the first distance is greater than the threshold distance. At block 822, responsive to the control system 118 determining that the first distance is greater than the threshold distance, the control system 118 adjusts the first filter position to a second filter position spaced from the first appendage position by the threshold distance. In some examples, the second filter position is (i) collinear with the first appendage position and the first filter position, (ii) between the first appendage position and the first filter position, and (iii) spaced from the first appendage position by the threshold distance.

At block 824, the control system 118 determines a second appendage position (e.g., a second instantaneous position) of the robot appendage 120 (e.g., based on additional input(s) received from the sensor(s) 112). At block 826, the control system 118 determines a second distance between the second appendage position and the second filter position. At block 828, the control system 118 determines, based on the second distance, a second force to apply to the robot appendage 120. The second force can be different than the first force. At block 830, the control system 118 causes the actuator(s) to apply the second force to the robot appendage 120.

IV. CONCLUSION

The above detailed description describes various features and functions of the disclosed systems, devices, and methods with reference to the accompanying figures. In the figures, similar symbols typically identify similar components, unless context indicates otherwise. The illustrative implementations described in the detailed description, figures, and claims are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example implementations. Alternative implementations are included within the scope of these example implementations. In these alternative implementations, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

For example, in one alternative implementation of the processes shown in FIGS. 5-6, the control system 118 can determine whether (a) the appendage 120 is in the stance state and (b) a predetermined amount of time ("a settling time") has passed since the appendage 120 transitioned last transitioned into the stance state at block 536 in FIG. 5 or blocks 606 and 636 in FIG. 6. Doing so may help to omit variations in appendage position that are due to violent touchdown dynamics experienced during transition from the swing state to the stance state. In one example, the settling time can be approximately 0.001 seconds to approximately 0.050 seconds. In another example, the settling time can be approximately 0.010 seconds to approximately 0.020 seconds. And, in yet another example, the settling time can be approximately 0.015 seconds.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

A computer-readable medium may include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A computer-implemented method comprising:
   identifying, by data processing hardware of a robot, a touchdown of an appendage of the robot;
   identifying, by the data processing hardware, a first position of the appendage based on the touchdown of the appendage of the robot;
   identifying, by the data processing hardware, a second position of the appendage;
   determining, by the data processing hardware, a difference between the first position of the appendage and the second position of the appendage; and
   instructing, by the data processing hardware, one or more actuators of the robot to apply a force at the appendage based on the difference between the first position of the appendage and the second position of the appendage.

2. The method of claim 1, further comprising updating the second position of the appendage to obtain an updated second position of the appendage.

3. The method of claim 2, further comprising instructing the one or more actuators to adjust the force at the appendage based on a difference between a third position of the appendage and the updated second position of the appendage.

4. The method of claim 2, wherein updating the second position of the appendage comprises:
   maintaining the second position of the appendage; or
   modifying the second position of the appendage.

5. The method of claim 2, wherein the updated second position of the appendage is collinear with a third position of the appendage and between the third position of the appendage and the second position of the appendage.

6. The method of claim 2, wherein updating the second position of the appendage comprises setting the second position of the appendage equal to a third position of the appendage.

7. The method of claim 2, wherein updating the second position of the appendage comprises:
   determining the difference between the first position of the appendage and the second position of the appendage is greater than or matches a threshold distance; and
   modifying the second position of the appendage based on determining the difference between the first position of the appendage and the second position of the appendage is greater than or matches the threshold distance.

8. The method of claim 1, wherein instructing the one or more actuators to apply the force comprises:
   receiving sensor data associated with the appendage;
   determining, based on the sensor data, a velocity of the appendage; and
   instructing the one or more actuators to apply the force based on the velocity.

9. The method of claim 1, wherein the force is proportional to the difference between the first position of the appendage and the second position of the appendage.

10. The method of claim 1, wherein application of the force causes the appendage to move from the first position of the appendage towards the second position of the appendage.

11. A robot comprising:
    a body;
    one or more appendages coupled to the body;
    data processing hardware in communication with the one or more appendages, and
    memory in communication with the data processing hardware, the memory storing instructions that when executed on the data processing hardware cause the data processing hardware to:
    identify a touchdown of an appendage of the one or more appendages;
    identify a first position of the appendage based on the touchdown of the appendage of the robot;
    identify a second position of the appendage;
    determine a difference between the first position of the appendage and the second position of the appendage; and instruct one or more actuators of the robot to apply a force at the appendage based on the difference between the first position of the appendage and the second position of the appendage.

12. The robot of claim 11, wherein execution of the instructions on the data processing hardware further causes the data processing hardware to update the second position of the appendage to obtain an updated second position of the appendage.

13. The robot of claim 12, wherein the execution of the instructions on the data processing hardware further causes the data processing hardware to instruct the one or more actuators to adjust the force at the appendage based on a difference between a third position of the appendage and the updated second position of the appendage.

14. The robot of claim 12, wherein to update the second position of the appendage, the execution of the instructions on the data processing hardware further causes the data processing hardware to:
 maintain the second position of the appendage; or
 modify the second position of the appendage.

15. The robot of claim 12, wherein the updated second position of the appendage is collinear with a third position of the appendage and between the third position of the appendage and the second position of the appendage.

16. The robot of claim 12, wherein to update the second position of the appendage, the execution of the instructions on the data processing hardware further causes the data processing hardware to set second position of the appendage equal to a third position of the appendage.

17. The robot of claim 12, wherein to update the second position of the appendage, the execution of the instructions on the data processing hardware further causes the data processing hardware to:
 determine the difference between the first position of the appendage and the second position of the appendage is greater than or matches a threshold distance; and
 modify the second position of the appendage based on determining the difference between the first position of the appendage and the second position of the appendage is greater than or matches the threshold distance.

18. The robot of claim 11, wherein to instruct the one or more actuators to apply the force, execution of the instructions on the data processing hardware further causes the data processing hardware to:
 receive sensor data associated with the appendage;
 determine, based on the sensor data, a velocity of the appendage; and
 instruct the one or more actuators to apply the force based on the velocity.

19. The robot of claim 11, wherein the force is proportional to the difference between the first position of the appendage and the second position of the appendage.

20. The robot of claim 11, wherein application of the force causes the appendage to move from the first position of the appendage towards the second position of the appendage.

* * * * *